(12) United States Patent
Park et al.

(10) Patent No.: US 12,300,039 B2
(45) Date of Patent: May 13, 2025

(54) ELECTRONIC DEVICE GUIDING USER TOUCH INPUT AND METHOD FOR CONTROLLING THE SAME

(71) Applicant: SAMSUNG ELECTRONICS CO., LTD., Suwon-si (KR)

(72) Inventors: Mijung Park, Suwon-si (KR); Hyeonho Kim, Suwon-si (KR); Soyoung Park, Suwon-si (KR); Jinwook Kang, Suwon-si (KR); Yangsoo Lee, Suwon-si (KR); Hyemi Lee, Suwon-si (KR); Kangwook Her, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/141,777

(22) Filed: May 1, 2023

(65) Prior Publication Data

US 2024/0021022 A1 Jan. 18, 2024

Related U.S. Application Data

(63) Continuation of application No. PCT/KR2023/005265, filed on Apr. 19, 2023.

(30) Foreign Application Priority Data

Jul. 15, 2022 (KR) .................. 10-2022-0087730

(51) Int. Cl.
*G06V 40/60* (2022.01)
*G06V 40/12* (2022.01)
(Continued)

(52) U.S. Cl.
CPC .......... *G06V 40/67* (2022.01); *G06V 40/1312* (2022.01); *G06V 40/1365* (2022.01); *G06V 40/50* (2022.01)

(58) Field of Classification Search
CPC .............. G06V 40/50; G06V 40/1359; G06V 40/1365; G06V 40/1371; G06V 40/1376
See application file for complete search history.

(56) References Cited

U.S. PATENT DOCUMENTS

| 2014/0003678 A1 | 1/2014 | Vieta et al. |
| 2015/0074615 A1 | 3/2015 | Han et al. |
(Continued)

FOREIGN PATENT DOCUMENTS

| CN | 107690654 A | 2/2018 |
| CN | 112395925 A | 2/2021 |
(Continued)

OTHER PUBLICATIONS

International Search Report and Written Opinion (PCT/ISA/210 and PCT/ISA/237) dated Jul. 14, 2023, issued by International Searching Authority in International Application No. PCT/KR2023/005265.

*Primary Examiner* — Yuzhen Shen
(74) *Attorney, Agent, or Firm* — Sughrue Mion, PLLC

(57) ABSTRACT

Provided is an electronic device. The electronic device may include a display, a fingerprint sensor provided in an area of the display, and at least one processor. The at least one processor may receive a user input for fingerprint registration, based on the user input, control the display to display a first user interface displaying information to guide a position for a touch input based on a position of the fingerprint sensor at a first position on the display, and based on receiving a first touch on the first user interface, control the display to display a second user interface indicating a degree of a fingerprint recognition related to the first touch.

16 Claims, 23 Drawing Sheets

(51) Int. Cl.
*G06V 40/13* (2022.01)
*G06V 40/50* (2022.01)

(56) References Cited

U.S. PATENT DOCUMENTS

| | | | |
|---|---|---|---|
| 2016/0239701 A1* | 8/2016 | Lee | G06V 40/1335 |
| 2017/0336906 A1* | 11/2017 | Yoon | G06F 3/041661 |
| 2018/0114047 A1* | 4/2018 | Kim | G06F 21/32 |
| 2018/0189468 A1 | 7/2018 | Shim et al. | |
| 2018/0253614 A1 | 9/2018 | Lee et al. | |
| 2019/0213381 A1 | 7/2019 | Lee et al. | |
| 2019/0228139 A1* | 7/2019 | Oh | G06V 40/13 |
| 2019/0362129 A1* | 11/2019 | Sandhan | H04M 1/725 |
| 2021/0004561 A1* | 1/2021 | Xu | G06V 40/63 |
| 2021/0166047 A1* | 6/2021 | Juncker | G06V 40/1306 |
| 2021/0286866 A1* | 9/2021 | Jin | G06V 40/1329 |

FOREIGN PATENT DOCUMENTS

| | | | | |
|---|---|---|---|---|
| KR | 10-2015-0098158 A | 8/2015 | | |
| KR | 10-2019-0090260 A | 8/2019 | | |
| KR | 10-2022-0062424 A | 5/2022 | | |
| WO | WO-2020009452 A1 * | 1/2020 | | G06F 1/1684 |
| WO | WO-2022066197 A1 * | 3/2022 | | G06F 3/01 |

\* cited by examiner

| | Moved coordinates | Point intended for registration |
|---|---|---|
| 1 | A = X<br>B = Y |  |
| 2 | A = X<br>B = Y+3 |  |
| 3 | A = X-3<br>B = Y+3 |  |
| 4 | A = X-3<br>B = Y |  |
| 5 | A = X-3<br>B = Y-3 |  |
| 6 | A = X<br>B = Y-3 |  |
| 7 | A = X+3<br>B = Y-3 |  |
| 8 | A = X+3<br>B = Y |  |
| 9 | A = X+3<br>B = Y+3 |  |

ELECTRONIC DEVICE GUIDING USER TOUCH INPUT AND METHOD FOR CONTROLLING THE SAME

CROSS-REFERENCE TO RELATED APPLICATIONS

This application is a continuation of International Application No. PCT/KR2023/005265, filed Apr. 19, 2023, designating the United States, in the Korean Intellectual Property Receiving Office, and claiming priority to Korean Patent Application No. 10-2022-0087730, filed Jul. 15, 2022, the disclosures of which are all hereby incorporated by reference herein in their entireties.

BACKGROUND

1. Field

The disclosure relates to an electronic device, and more particularly, to an electronic device for guiding a user touch input and a method for controlling the same.

2. Description of Related Art

Due to advancements in digital technology, various types of electronic devices, such as mobile communication terminals, personal digital assistants (PDAs), electronic schedulers, smartphones, tablet personal computers (PCs), and wearable devices, are in wide use. To support and increase functions, hardware parts and/or software parts of electronic devices are continuously being enhanced.

For example, electronic devices capture photos and/or videos, pay for goods and services, protect electronic devices through biometric authentication, and/or support financial transactions. Biometric authentication is a scheme for authenticating through biological tissue, and may use a characteristic that the biological tissue is unique to each person. Biometric authentication may include authentication through various biological tissues including fingerprint, retina, iris, hand, face, and/or voice.

SUMMARY

According to an aspect of the disclosure, an electronic device includes a display, a fingerprint sensor provided in an area of the display and at least one processor, the at least one processor may receive a user input for fingerprint registration, based on the user input, control the display to display a first user interface displaying information to guide a position for a touch input based on a position of the fingerprint sensor, at a first position on the display, and based on receiving a first touch on the first user interface, control the display to display a second user interface indicating a degree of a fingerprint recognition related to the first touch.

According to an embodiment, the second user interface may be obtained by increasing a size of the first user interface.

According to an embodiment, the at least one processor may be further configured to display, on the display, a third user interface indicating a progress amount of the fingerprint registration based on a plurality of touches.

According to an embodiment, the at least one processor may be further configured to, based on completion of the fingerprint recognition related to the first touch, control the display to change the third user interface to increase the progress amount of the fingerprint registration.

According to an embodiment, the at least one processor may be further configured to display, on the display, a message indicating a failure of the fingerprint recognition, based on termination of the first touch before the fingerprint recognition related to the first touch is complete.

According to an embodiment, the at least one processor may be further configured to control the display to reposition the first user interface displaying information to guide a second touch input to a second position on the display that is different from the first position, based on termination of the first touch after the fingerprint recognition related to the first touch is complete.

According to an embodiment, the at least one processor may be further configured to, based on a fingerprint being recognized only through a partial area of the fingerprint sensor after the first user interface is repositioned, reduce a repositioning interval of the first user interface.

According to an embodiment, the at least one processor may be further configured to, based on a same fingerprint being recognized at least a preset number of times after the first user interface is repositioned increase a repositioning interval of the first user interface.

According to an embodiment, the at least one processor may be further configured to resize the second user interface based on a size of an area of the first touch.

According to an embodiment, the at least one processor may be further configured to reshape the first user interface based on a shape of an area of the first touch.

According to an aspect of the disclosure, a method for controlling an electronic device includes, receiving a user input for fingerprint registration, based on the user input, displaying, at a first position on a display of the electronic device, a first user interface displaying information to guide a position for a touch input based on a position of a fingerprint sensor, and based on receiving a first touch on the first user interface, displaying, on the display, a second user interface indicating a degree of a fingerprint recognition related to the first touch.

According to an embodiment, the second user interface may be obtained by increasing a size of the first user interface.

According to an embodiment, the method may further include displaying, on the display, a third user interface indicating a progress amount of the fingerprint registration based on a plurality of touches.

According to an embodiment, the method may further include, based on completion of the fingerprint recognition related to the first touch, changing the third user interface to increase the progress amount of the fingerprint registration.

According to an embodiment, the method may further include, based on termination of the first touch before the fingerprint recognition related to the first touch is complete, displaying, on the display, a message indicating a failure in the fingerprint recognition.

According to an embodiment, the method may further include, based on termination of the first touch after the fingerprint recognition related to the first touch is complete, repositioning the first user interface for displaying information to guide a second touch input to be displayed at a second position on the display that is different from the first position.

According to an embodiment, the method may further include, based on a fingerprint being recognized only through a partial area of the fingerprint sensor after the first user interface is repositioned, reducing a repositioning interval of the first user interface.

According to an embodiment, the method may further include, based on a same fingerprint being recognized at least a preset number of times after the first user interface is repositioned, increasing a repositioning interval of the first user interface.

According to an embodiment, the method may further include resizing the second user interface based on a size of an area of the first touch.

According to an embodiment, the method may further include reshaping the first user interface based on a shape of an area of the first touch.

According to an aspect of the disclosure, an electronic device includes, at least one memory configured to store instructions, and at least one processor configured to execute the instructions to, receive a user input for registering a fingerprint using a fingerprint sensor, based on the user input, display a first user interface to guide a position for a touch input based on a position of the fingerprint sensor at a first position on a display, and based on receiving a first touch on the first user interface, display, on the display, a second user interface indicating a degree of a fingerprint recognition related to the first touch.

According to an embodiment, the at least one processor may be further configured to display the second user interface to include a progress bar indicating a time remaining for registering the fingerprint.

According to an embodiment, the at least one processor may be further configured to display an error message based on the fingerprint not registering.

According to an embodiment, the at least one processor may be further configured to display the error message to indicate the user input is not maintained for a predetermined time.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The example embodiments of the disclosure will be described in detail below with reference to the accompanying drawings.

Figure 1:
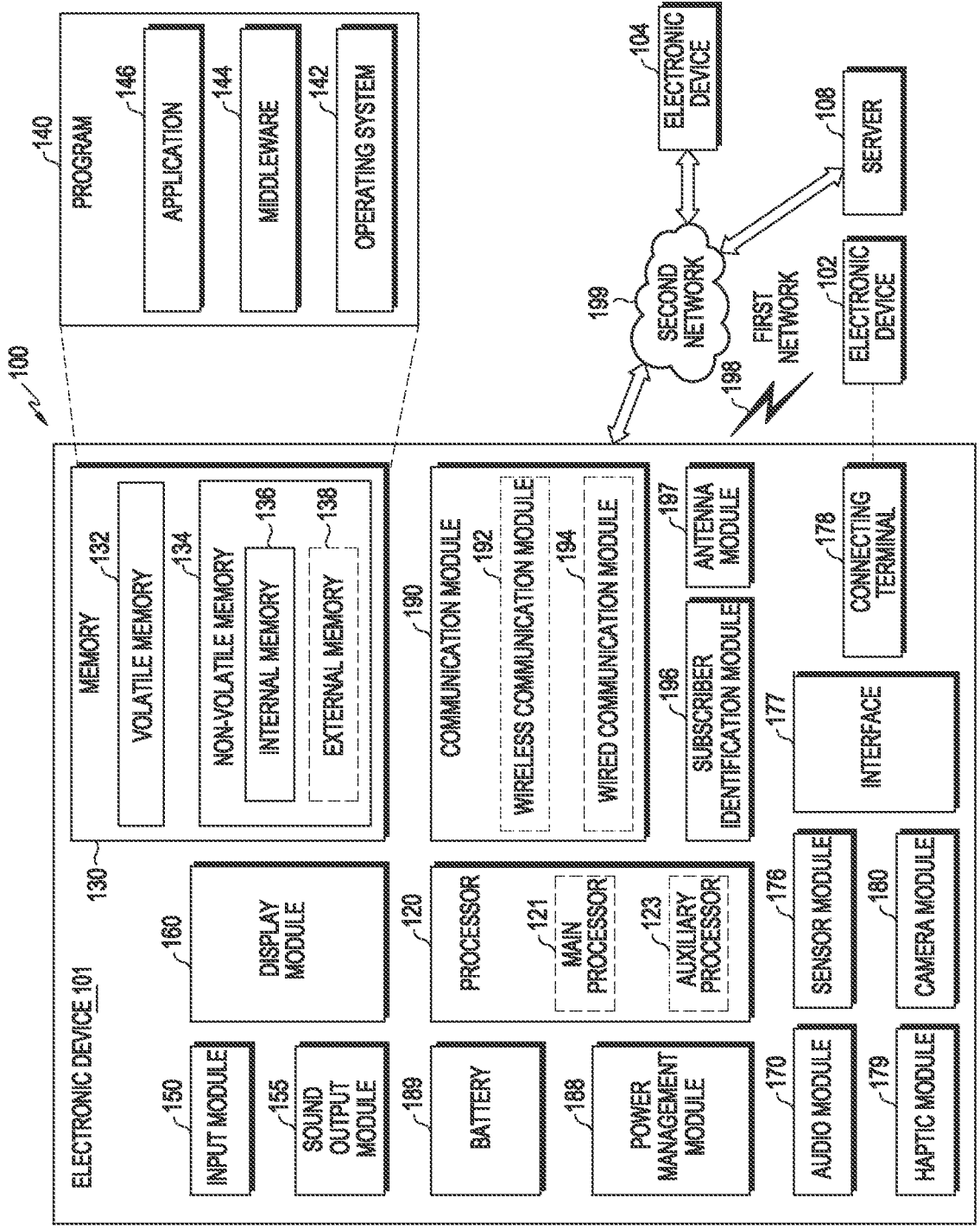
FIG. 1 is a block diagram illustrating an electronic device in a network environment, according to an embodiment.

FIG. 1 is a block diagram illustrating an electronic device 101 in a network environment 100 according to an embodiment. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

In fingerprint recognition, evenly registering good-quality fingerprint information may be good for recognition rate. However, for the on-screen fingerprint sensor, which is smaller than the fingerprint, disposed on the display, the fingerprint sensor may be hidden during fingerprint registration, and by the on-screen nature, the user may not perceive the touch point through tactile sense. Thus, it may be hard for the user to touch the correct portion and register her fingerprint. Further, for the on-screen fingerprint sensor, placing the fingerprint for a sufficient time during fingerprint registration is a good way for better recognition. However, the user tends to frequency repeat placing and lifting her finger, so that fingerprint registration is performed without the finger being placed for a sufficient time, causing a failure to store high-quality fingerprint data, with the result of a poor fingerprint recognition rate.

Thus, the disclosure provides an electronic device that is equipped with an on-screen fingerprint sensor and displays a user interface that provides a touch guide considering the fingerprint size, leads to even fingerprint registration by repeatedly providing it while changing the position in a designated order, and allows a touch to be continuously maintained for a threshold or longer upon attempting fingerprint registration by touching the touch guide, with reference to FIGS. 2 to 17.

Figure 2:
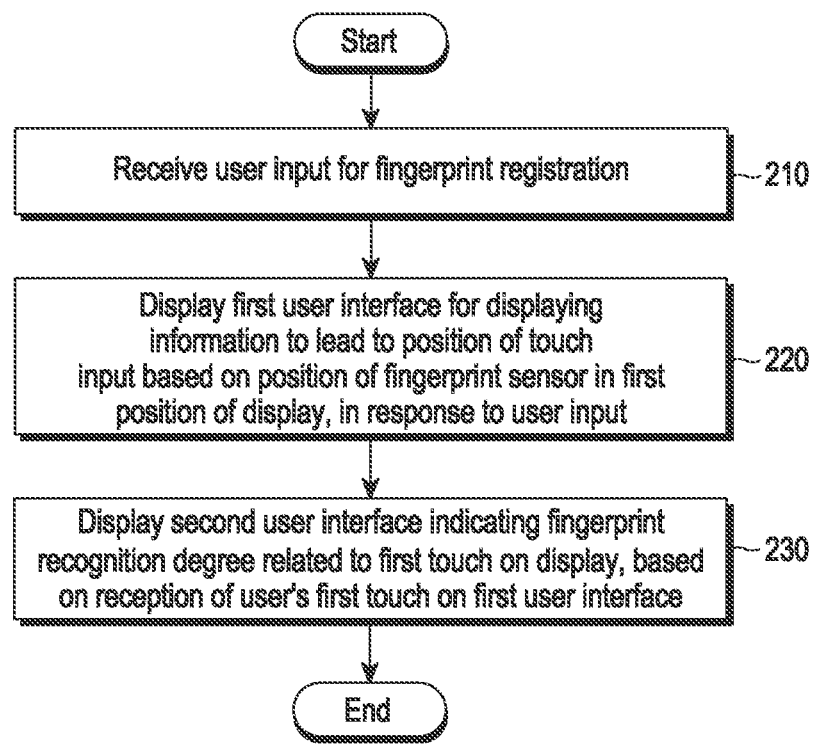
FIG. 2 is a flowchart illustrating an operation of displaying a touch guide by an electronic device, according to an embodiment of the disclosure.

FIG. 2 is a flowchart illustrating an operation of displaying a touch guide by an electronic device, according to an embodiment of the disclosure.

Referring to FIG. 2, in operation 210, an electronic device (e.g., the electronic device 101 of FIG. 1 or the processor 120 of FIG. 1) may receive a user input for fingerprint registration.

According to an embodiment, the electronic device may receive a user input of selecting an item for register a fingerprint to be used for fingerprint authentication. For example, the user input for fingerprint registration may be received through touch, voice, or an external input device.

According to an embodiment, in operation 220, the electronic device may display a first user interface for leading the user to a touch input position in a first position of the display (e.g., the display module 160 of FIG. 1) based on the position of the fingerprint sensor (e.g., the sensor module 176 of FIG. 1) in response to the user input for fingerprint registration.

According to an embodiment, the first user interface may include a user interface for guiding a touch position. According to an embodiment, the first user interface may further include a fingerprint-shaped icon in a center area of the user interface for a guide. According to an embodiment, the fingerprint-shaped icon is for leading to a touch input, and is not limited to a fingerprint form but may be any form which may lead to a touch input.

According to an embodiment, the first user interface may be displayed in a position including the area corresponding to the position of the fingerprint sensor. According to an embodiment, the first user interface may be displayed for at least a portion of the touch area to overlap at least a portion of the area corresponding to the position of the fingerprint sensor. According to an embodiment, the user interface indicating the area corresponding to the position of the fingerprint sensor may be displayed or may not be displayed.

According to an embodiment, the first user interface is described below in greater detail with reference to FIG. 3A.

According to an embodiment, the first position may be an area where the first user interface is disposed so that the center of the area corresponding to the position of the fingerprint sensor is identical to the center of the first user interface. According to an embodiment, the first position is described below with reference to FIG. 16A.

According to an embodiment, in operation 230, the electronic device may display a second user interface indicating the fingerprint recognition degree (e.g., process) related to touch, based on reception of the user's first touch on the first user interface.

According to an embodiment, the electronic device may recognize one partial fingerprint through the user's one touch. According to an embodiment, the electronic device may perform one fingerprint registration, based on a plurality of partial fingerprints obtained through the user's multiple touches.

According to an embodiment, the second user interface may be a first user interface enlarged based on reception of a touch. According to an embodiment, the first user interface may be hidden by the user touch, and the second user interface may increase the size of the first user interface to be shown to the user despite the user touch. For example, the second user interface may be one produced by enlarging the guide user interface included in the first user interface. According to an embodiment, the guide user interface may be a border of the first user interface. According to an embodiment, the second user interface may have a large size and a different shape from the first user interface.

According to an embodiment, the second user interface may be one produced by increasing the thickness of the guide user interface of the first user interface, as well as the size of the guide user interface. For example, the second user interface may be a thicker solid line than the guide user interface of the first user interface which is a thin solid line.

According to an embodiment, the second user interface may display the recognition degree of partial fingerprint in real-time. According to an embodiment, the operation of displaying the recognition degree of partial fingerprint in real-time is described below in greater detail with reference to FIGS. 4A, 8A, 10B, 11, and 13.

According to an embodiment, the electronic device may change the position of the first user interface from the first position to a second position based on termination of the touch after recognition of partial fingerprint related to the touch is complete. For example, if the touch is released after recognition of one partial fingerprint is complete, the electronic device may reposition and display the guide user interface to lead to recognition of partial fingerprint in another area in the first user interface. According to an embodiment, when a fingerprint-shaped icon is included in the first user interface, the fingerprint-shaped icon may also be repositioned. According to an embodiment, when a user interface is displayed in the position corresponding to the fingerprint sensor in the first user interface, the position of the user interface corresponding to the fingerprint sensor may be maintained while only the position of the first user interface may be changed. According to an embodiment, the operation of repositioning the first user interface is described below in greater detail with reference to FIGS. 16A and 16B.

According to an embodiment, upon failing in recognition of partial fingerprint related to touch, the electronic device may display an error message. For example, the electronic device may display a message indicating failure in partial fingerprint recognition based on termination of the touch before recognition of partial fingerprint related to the touch is complete. For example, the electronic device may display a message to instruct to maintain the touch for a longer time. According to an embodiment, upon displaying an error message, the electronic device may further provide at least one of haptic feedback, sound feedback, or highlight display.

According to an embodiment, if the touch departs off the area sensible by the fingerprint sensor so that only a portion of the intended partial fingerprint is recognized or the partial fingerprint is not recognized, the electronic device may display a message to instruct to adjust the touch position. According to an embodiment, the operation of displaying an error message by an electronic device is described below in detail with reference to FIGS. 7, 8B, 9A, and 9B.

According to an embodiment, the electronic device may resize the second user interface based on the size of the area of the touch. For example, when the size of the touch area is larger than the size of the existing second user interface due to the user's big or thick finger, the second user interface may be hidden by the user's finger. The electronic device may increase the size of the second user interface. For example, the electronic device may enlarge the second user interface to be larger than the user's finger based on the size of the touch area. According to an embodiment, the operation of resizing the second user interface is described below in greater detail with reference to FIG. 14.

According to an embodiment, when the size of the touch area is smaller than the size of the existing second user interface by a set ratio or more due to the user's small or thin finger, the chance to recognize a partial fingerprint different from the partial fingerprint led to be touched increases. Thus, the electronic device may shrink the second user interface. For example, the electronic device may shrink the second user interface so that the difference in size from the user's finger is not significant based on the size of the touch area.

According to an embodiment, the electronic device may reshape the first user interface based on the shape of the touch area. For example, since the shape of the touch area differs depending on the direction of the hand (e.g., right hand or left hand) gripping the electronic device, the electronic device may reshape the first user interface based on the shape of the touch area, changing the shape of the first user interface to allow the user to enter touch more conveniently. According to an embodiment, the operation of reshaping the first user interface is described below with reference to FIG. 15.

According to an embodiment, the electronic device may adjust the repositioning interval of the first user interface based on the recognized partial fingerprint after the first user interface is repositioned based on completion of partial fingerprint recognition.

According to an embodiment, the electronic device may reduce the repositioning interval of the first user interface based on recognition of partial fingerprint only through a partial area of the fingerprint sensor after the first user interface is repositioned. This is why a touch may depart off the area recognizable by the fingerprint sensor although made to the changed first user interface due to the user's small or thin finger.

According to an embodiment, when the touch departs off the area recognizable by the fingerprint sensor so that only a portion of the intended partial fingerprint is recognized or the partial fingerprint is not recognized, the electronic device may reduce the repositioning interval of the first user interface.

According to an embodiment, the electronic device may display a message including a content saying that the partial fingerprint recognition has not normally been performed, a content saying that the position of the first user interface has been adjusted, or a content to lead to make a touch according to the repositioned first user interface.

According to an embodiment, the electronic device may increase the repositioning interval of the first user interface based on recognizing the same partial fingerprint a preset number of times or more after the first user interface has been repositioned. This is why the fingerprint recognized by the fingerprint sensor is duplicated or the duplicated area is large in size although the touch is made according to the changed first user interface due to the user's large or thick finger.

According to an embodiment, the operation of adjusting the repositioning interval of the first user interface is described below with reference to FIG. 17.

According to an embodiment, the electronic device may further display a third user interface displaying a fingerprint registration process on the display.

According to an embodiment, registration of one fingerprint may be performed based on a plurality of partial fingerprints. For example, the electronic device may recognize each of a plurality of partial fingerprints through a plurality of touches and combine the plurality of partial fingerprints to register one fingerprint.

According to an embodiment, the electronic device may obtain the fingerprint registration progress based on the ratio of the recognition-completed partial fingerprints to the plurality of partial fingerprints necessary for fingerprint registration. According to an embodiment, the electronic device may display the obtained fingerprint registration progress through the third user interface.

According to an embodiment, the electronic device may change the third user interface to increase the fingerprint registration progress based on completion of recognition of the partial fingerprint related to the touch. According to an embodiment, the operation of changing to increase the fingerprint registration progress is described below with reference to FIG. 10C.

According to an embodiment, it has been described above that if recognition of the partial fingerprint related to touch is complete, the fingerprint registration progress is increased. However, the fingerprint registration progress may be changed in real-time based on the recognition degree of partial fingerprint.

As such, as the electronic device of the disclosure provides the user with the touch guide and/or partial fingerprint recognition progress, it is possible to perform fingerprint registration more efficiently than when the user arbitrarily touches and registers fingerprint.

Figure 3A:
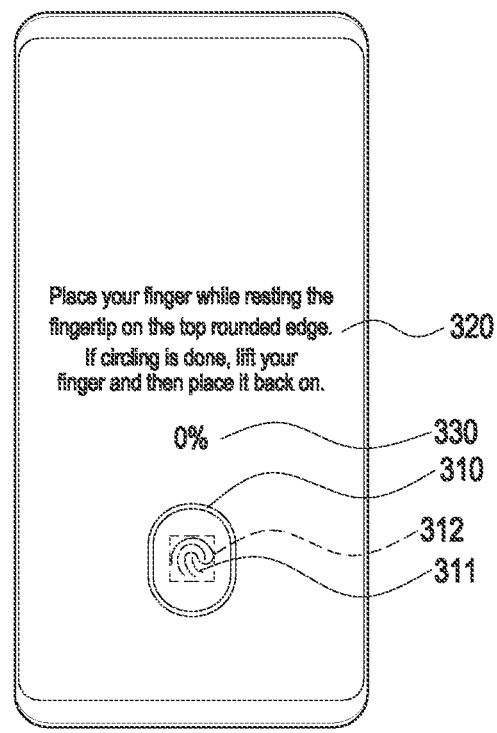
FIG. 3A is a view illustrating a screen displayed upon waiting for partial fingerprint recognition by an electronic device, according to an embodiment of the disclosure.

FIG. 3A is a view illustrating a screen displayed upon waiting for partial fingerprint recognition by an electronic device, according to an embodiment of the disclosure.

Referring to FIG. 3A, the electronic device (e.g., the electronic device 101 of FIG. 1 or the processor 120 of FIG. 1) may display a screen for fingerprint registration. According to an embodiment, the screen for fingerprint registration may include a first user interface 310 to indicate the touch position, a guide message 320 for fingerprint registration, and a third user interface 330 to indicate the fingerprint registration progress.

According to an embodiment, the first user interface may provide a vertically long shape based on the average fingerprint size and/or shape and may display a position where touch should be input intuitively. For example, the horizontal length of the first user interface 310 may be 16 mm, and the vertical length may be 18 mm, but is not limited thereto.

According to an embodiment, the first user interface 310 may include an icon 311 to lead to a touch. For example, the touch-leading icon 311 may have a fingerprint shape. According to an embodiment, the touch-leading icon 311 is not limited to a fingerprint shape, but may be any shape that may lead to a touch.

According to an embodiment, when fingerprint registration starts on the screen for fingerprint registration (e.g., when the fingerprint registration progress 330 is 0%), the electronic device may display the first user interface 310 in the first position. According to an embodiment, the first position may be an area where the first user interface 310 is disposed so that the center of the area 312 corresponding to the position of the fingerprint sensor is identical to the center of the first user interface 310.

According to an embodiment, the area 312 corresponding to the position of the fingerprint sensor may not be displayed on the display. According to an embodiment, the area 312 corresponding to the position of the fingerprint sensor may be displayed on the display. For example, the user interface indicating the area 312 corresponding to the position of the fingerprint sensor may intuitively provide the area where the fingerprint sensor is positioned. According to an embodiment, when the user interface indicating the area 312 corresponding to the position of the fingerprint sensor is displayed, repositioning of the first user interface 310 may mean that the position of the first user interface 310 is changed from the first position to the second position while the position of the user interface indicating the area 312 corresponding to the fingerprint sensor is maintained.

According to an embodiment, when the fingerprint sensor is an optical on-screen fingerprint sensor, the fingerprint sensor may scan fingerprint through a light source, and the color of the light source may differ depending on the type of the fingerprint sensor.

According to an embodiment, the guide message 320 for fingerprint registration may include a message to lead to the user's action necessary during the fingerprint registration process. For example, the guide message 320 for fingerprint registration may include content to lead to the touch position and indicate touch duration necessary for partial fingerprint, such as "Place your finger while resting the fingertip on the top rounded edge. If circling is done, lift your finger and then place it back on."

According to an embodiment, the third user interface 330 displaying the fingerprint registration progress may be obtained based on a ratio of recognition-completed partial fingerprints to the plurality of partial fingerprints necessary for registering one fingerprint. According to an embodiment, the fingerprint registration progress of the third user interface 330 may increase as the number of recognition-completed fingerprints increases. According to an embodiment, if the fingerprint registration progress included in the third user interface 330 is 100%, it may be in the state in which the plurality of partial fingerprints necessary for fingerprint registration all have been obtained. According to an embodiment, if the fingerprint registration progress included in the third user interface 330 is 100%, it may be in the state in which registration of one fingerprint has been completed based on the plurality of partial fingerprints, beyond the state in which the plurality of partial fingerprints all have been obtained.

Figure 3B:
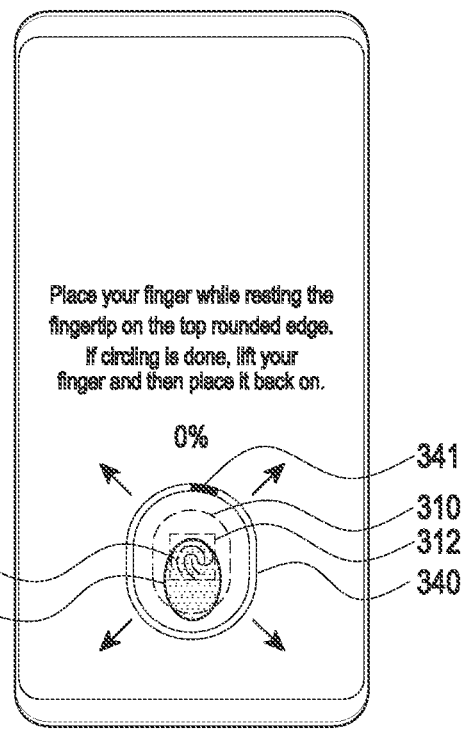
FIG. 3B is a view illustrating a screen displayed while performing partial fingerprint recognition by an electronic device, according to an embodiment of the disclosure.

FIG. 3B is a view illustrating a screen displayed while performing partial fingerprint recognition by an electronic device, according to an embodiment of the disclosure.

According to an embodiment, upon receiving the user's first touch 315 on the first user interface 310 (e.g., the first user interface 310 of FIG. 3A), the electronic device may display a second user interface 340 indicating the recognition progress of the partial fingerprint related to the first touch 315. According to an embodiment, the first user interface 310 may include an icon 311 to lead to a touch, and the touch-leading icon 311 may be displayed in at least a portion of the area 312 corresponding to the position of the fingerprint sensor.

According to an embodiment, the second user interface 340 indicating the recognition progress of the partial fingerprint related to the first touch 315 may be one produced by enlarging the first user interface 310 for the recognition processing progress to be more noticeable. According to an embodiment, the second user interface 340 may be larger than the first user interface 310 and have a different shape from the first user interface 310.

According to an embodiment, upon receiving the first touch 315, the electronic device may provide an animation effect to gradually enlarge the first user interface 310 to the second user interface 340.

According to an embodiment, upon receiving the first touch 315, the electronic device may immediately change the first user interface 310 to the second user interface 340.

According to an embodiment, the second user interface 340 indicating the recognition progress of the partial fingerprint related to the first touch 315 may include a progress effect to provide, in real-time, the recognition progress for the purpose of indicating that a predetermined quality of, or better, fingerprint information has been obtained.

According to an embodiment, upon receiving the first touch 315, the electronic device may display the second user interface 340 which is produced by enlarging the first user interface 310 and display a progress bar 341 shown in a thick border.

Figure 3C:
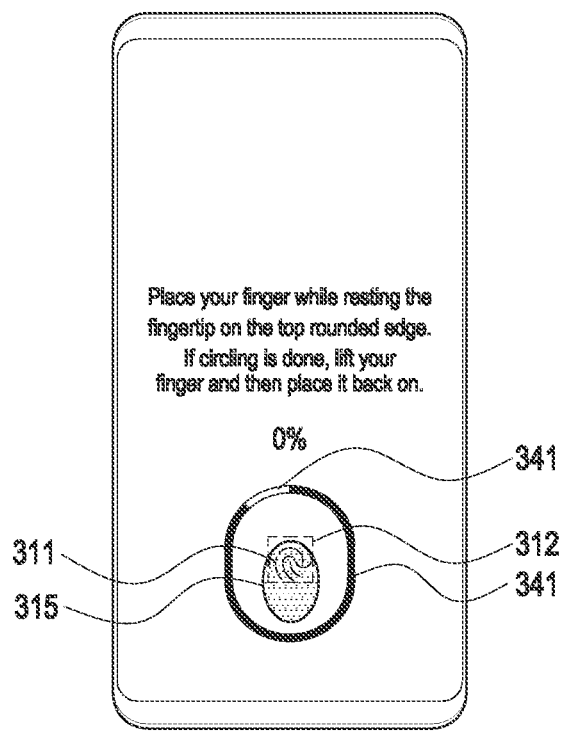
FIG. 3C is a view illustrating a screen displayed while performing partial fingerprint recognition by an electronic device, according to an embodiment of the disclosure.

FIG. 3C is a view illustrating a screen displayed while performing partial fingerprint recognition by an electronic device, according to an embodiment of the disclosure.

Referring to FIG. 3C, the electronic device may display the progress clockwise or counterclockwise through the progress bar 341 depending on the fingerprint recognition degree for the first touch 315 input on the touch-leading icon 311 displayed in at least a portion of the area 312 corresponding to the position of the fingerprint sensor.

According to an embodiment, in the second user interface 340 indicating the recognition progress of the partial fingerprint related to the first touch 315 through the progress bar 341, the progress bar 341 may not be fully filled when an error occurs during partial fingerprint recognition. According to an embodiment, the second user interface 340 indicating, in real-time, the recognition progress of the partial fingerprint may be in the form of the progress bar 341, but is not limited thereto, and may be in a form in which an area, rather than the bar shape, is filled in real-time, or the color of the area in the size corresponding to the recognition progress of the partial fingerprint may be changed in the entire screen.

According to an embodiment, the electronic device may lead the user to lift her finger at the time when the progress bar as the second user interface 340 is fully filled.

According to an embodiment, if the progress bar as the second user interface 340 is fully filled, the electronic device may provide a haptic feedback providing vibration, an audible feedback, and/or a visual feedback displaying a highlight.

According to an embodiment, when the progress bar 341 as the second user interface 340 is fully filled, the electronic device may display a guide message (e.g., the guide message 320 for fingerprint registration of FIG. 3A) for fingerprint registration to lead the user to lift her finger from the display.

Figure 3D:
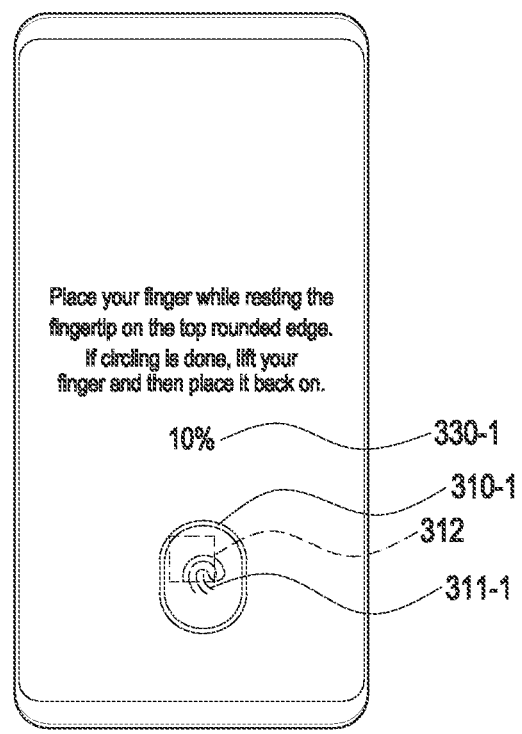
FIG. 3D is a view illustrating a screen in which a user interface guiding touch is moved after partial fingerprint recognition is complete by an electronic device, according to an embodiment of the disclosure.

FIG. 3D is a view illustrating a screen in which a user interface guiding touch is moved after partial fingerprint recognition is complete by an electronic device, according to an embodiment of the disclosure.

Referring to FIG. 3D, if the finger is lifted from the display after partial fingerprint recognition is complete, the electronic device may change the position of the first user interface 310-1 to lead to a second touch input. For example, the electronic device may change the position of the first user interface 310-1 to the second position with respect to the area 312 corresponding to the fingerprint sensor whose position is not changed. According to an embodiment, the position of the touch-leading icon 311-1 included in the first user interface 310-1 may also be changed.

According to an embodiment, when the user interface indicating the area 312 corresponding to the fingerprint sensor is displayed, the electronic device may maintain the position of the user interface indicating the area 312 corresponding to the fingerprint sensor and may change the position of the first user interface 310-1.

According to an embodiment, as fingerprint recognition by the first touch in the first position is complete, the electronic device may increase the fingerprint registration progress 330-1. For example, the electronic device may increase the fingerprint registration progress 330-1 from 0% to 10%.

According to an embodiment, it has been described above that if recognition of the partial fingerprint related to touch is complete, the fingerprint registration progress is increased. However, the fingerprint registration progress may be changed in real-time based on the recognition degree of partial fingerprint. For example, if the fingerprint registration progress 330-1 is gradually increased, such as to 0%, 1%, and 2%, based on the progress of fingerprint recognition by the first touch, and the fingerprint recognition by the first touch is complete, the electronic device may display the fingerprint registration progress 330-1 as 10%.

As such, it is possible to lead to recognition, through the fingerprint sensor, the partial fingerprint in a position different from the recognition-complete partial fingerprint of the fingerprint by changing the first user interface 310-1 leading to the second touch input.

Figure 4A:
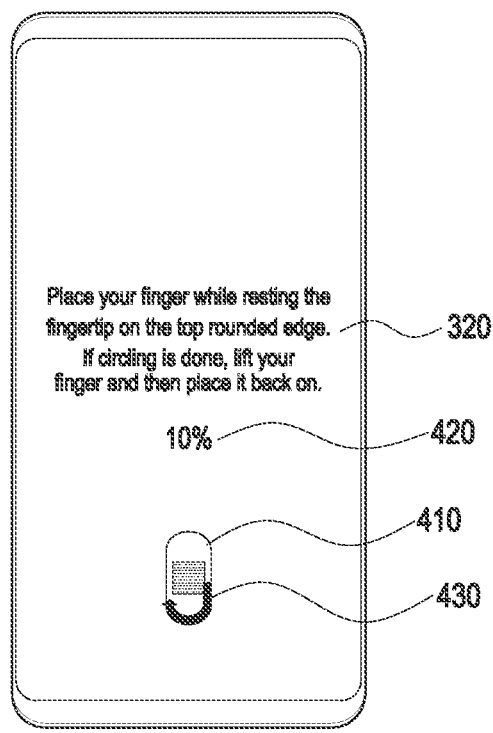
FIG. 4A is a view illustrating a screen displaying a partial fingerprint recognition performing rate while performing partial fingerprint recognition by an electronic device, according to an embodiment of the disclosure.

FIG. 4A is a view illustrating a screen displaying a partial fingerprint recognition performing rate while performing partial fingerprint recognition by an electronic device, according to an embodiment of the disclosure.

Figure 4B:
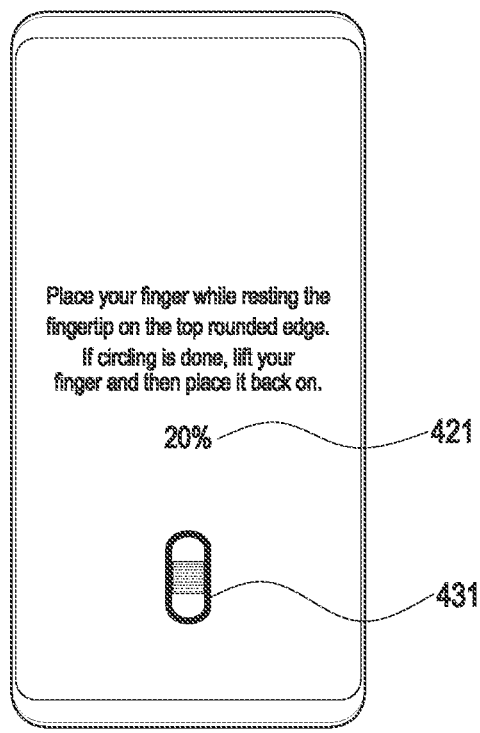
FIG. 4B is a view illustrating a screen in which partial fingerprint recognition by an electronic device is complete, according to an embodiment of the disclosure.

FIG. 4B is a view illustrating a screen in which partial fingerprint recognition by an electronic device is complete, according to an embodiment of the disclosure.

FIGS. 4A and 4B illustrate a state in which a touch is made by the user although the user's finger making the touch is omitted for convenience of description.

Referring to FIG. 4A, the electronic device (e.g., the electronic device 101 of FIG. 1 or the processor 120 of FIG. 1) may display a second user interface 410 indicating the recognition progress of the partial fingerprint of the touching finger and a third user interface 420 indicating the fingerprint registration progress.

According to an embodiment, the second user interface 410 may include a progress bar 430 that changes in real-time depending on the recognition progress of the partial fingerprint. According to an embodiment, the second user interface 410 and the progress bar 430 may have different thicknesses and/or colors. For example, the second user interface 410 may be a thin solid line, and the progress bar 430 may be a thick solid line. The progress bar 430 may display the recognition progress of the partial fingerprint by drawing a thick solid line clockwise or counterclockwise along the thin solid line of the second user interface 410 from a specific point of the second user interface 410.

According to an embodiment, the second user interface 410 may be a thin white solid line, and the progress bar 430 may be a thin or thick solid line in a different color (e.g., green). The progress bar 430 may display the recognition progress of the partial fingerprint by drawing a thin or thick solid line in the different color clockwise or counterclockwise along the thin solid line of the second user interface 410 from a specific point of the second user interface 410.

According to an embodiment, the second user interface 410 may be a plane shape, and the progress bar 430 may display the recognition progress of the partial fingerprint by being drawn clockwise or counterclockwise along the border of the plane.

According to an embodiment, the second user interface 410 may be, rather than in the form of the progress bar 430, in a form in which an area, rather than the bar shape, is filled in real-time, or the color of the area in the size corresponding to the recognition progress of the partial fingerprint may be changed in the entire screen.

According to an embodiment, as shown in FIG. 4B, the electronic device may display the progress bar 431 as completely drawn if recognition of the partial fingerprint positioned on the fingerprint sensor is complete. According to an embodiment, since the recognized partial fingerprints have increased, the electronic device may increase the fingerprint registration progress of the third user interface 421. For example, if the partial fingerprint recognition is complete, the electronic device may increase the fingerprint registration progress, which is 10% as shown in FIG. 4A, to 20% as shown in FIG. 4B.

According to an embodiment, when the second user interface 410 is a solid line in a specific color (e.g., gray), and the progress bar is drawn in white on the second user interface in real-time according to the partial fingerprint recognition rate, if partial fingerprint recognition is complete, the electronic device may change the progress bar into green. According to an embodiment, if an error occurs during partial fingerprint recognition, the electronic device may change the color of the progress bar into red, indicating that an error occurs.

Figure 5:
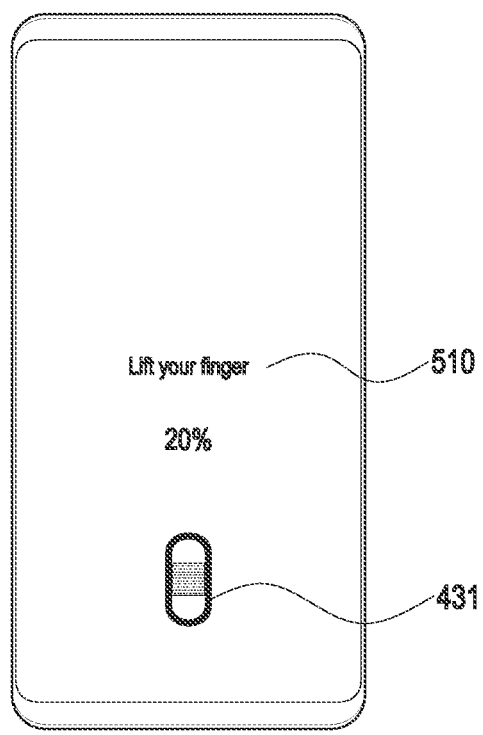
FIG. 5 is a view illustrating a screen displayed when a touch is not terminated even after partial fingerprint recognition by an electronic device is complete, according to an embodiment of the disclosure.

FIG. 5 is a view illustrating a screen displayed when a touch is not terminated even after partial fingerprint recognition by an electronic device is complete, according to an embodiment.

Referring to FIG. 5, if the touch is not released even after partial fingerprint recognition is complete, the electronic device (e.g., the electronic device 101 of FIG. 1 or the processor 120 of FIG. 1) may display a message 510 to lead to release the touch. For example, the electronic device may display a message, such as "Lift your finger," leading to release the touch.

According to an embodiment, if the touch is released, the electronic device may delete the second user interface and display a changed first user interface (e.g., the first user interface 310-1 of FIG. 3D). For example, the changed first user interface may denote one in which the position of the guide user interface for the user interface corresponding to the fingerprint sensor has been changed.

Figure 6A:
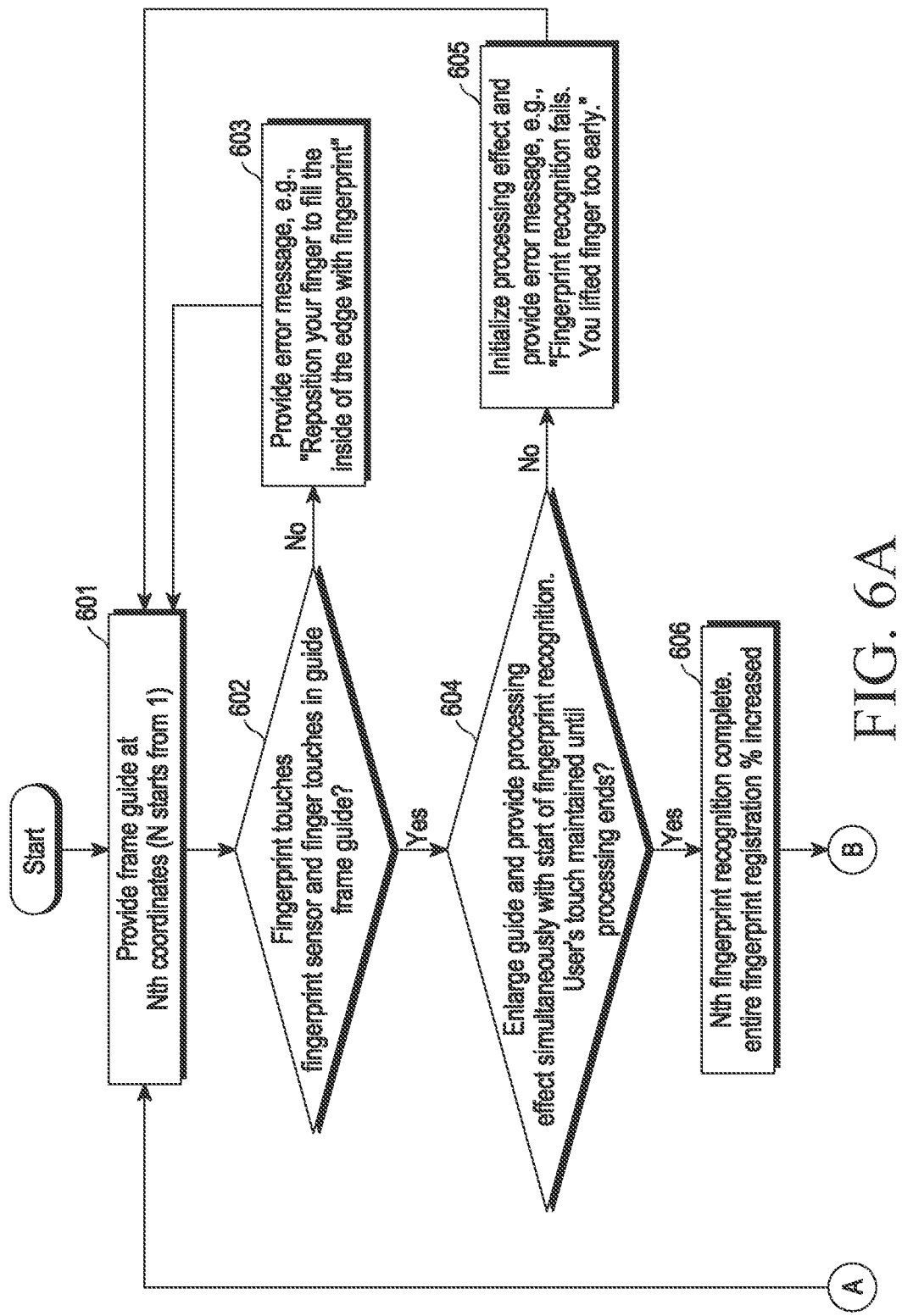
FIG. 6A is a flowchart illustrating a fingerprint registration operation by an electronic device, according to an embodiment of the disclosure.

FIG. 6A is a flowchart illustrating a fingerprint registration operation by an electronic device, according to an embodiment of the disclosure.

Figure 6B:
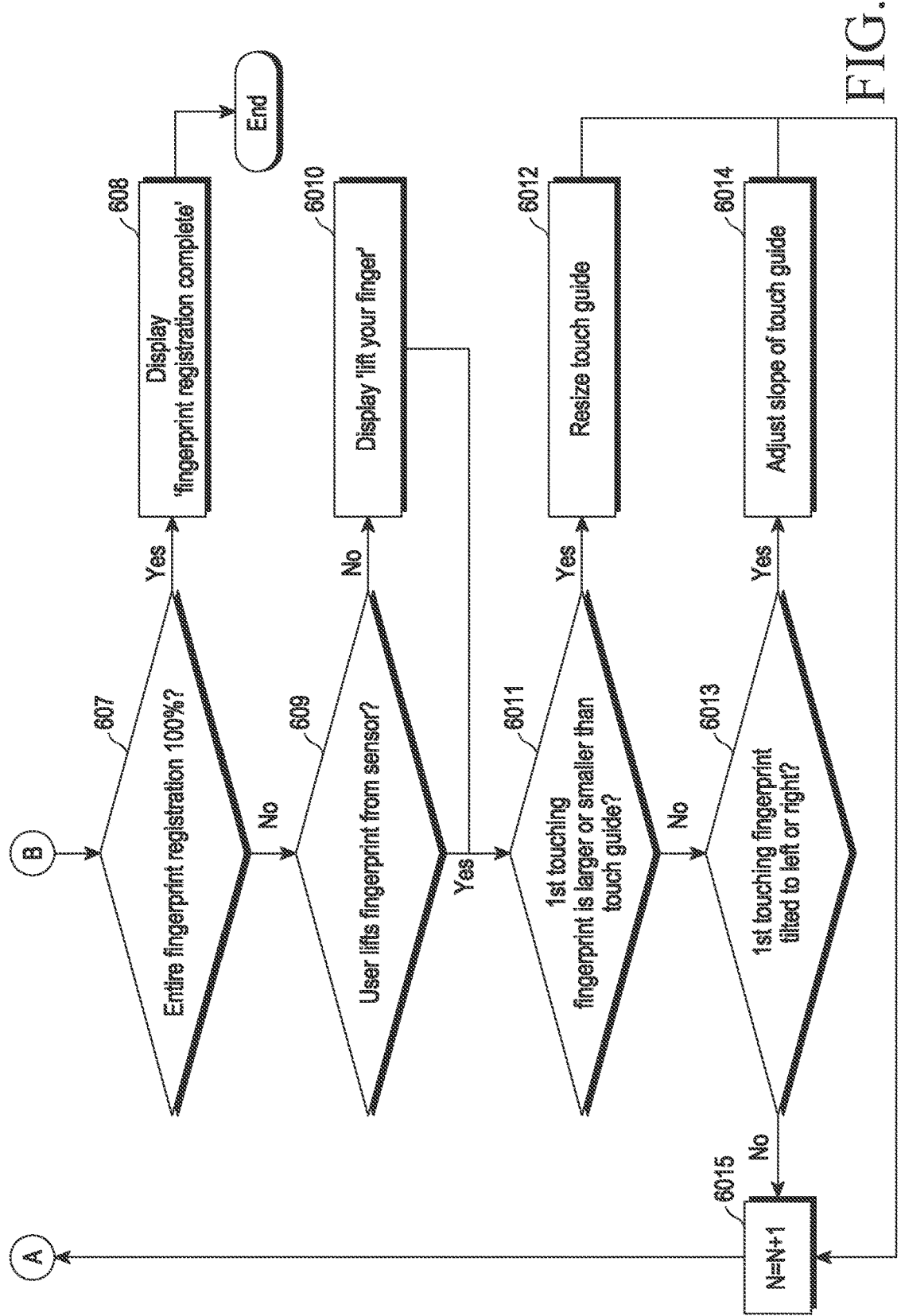
FIG. 6B is a flowchart illustrating a fingerprint registration operation by an electronic device, according to an embodiment of the disclosure.

FIG. 6B is a flowchart illustrating a fingerprint registration operation by an electronic device, according to an embodiment of the disclosure.

Referring to FIGS. 6A and 6B, in operation 601, the electronic device (e.g., the electronic device 101 of FIG. 1 or the processor 120 of FIG. 1) may provide a frame guide (e.g., the first user interface 310 of FIG. 3A) at Nth coordinates. According to an embodiment, the Nth coordinates mean the coordinates of the frame guide corresponding to the Nth partial fingerprint. According to an embodiment, N starts from 1.

According to an embodiment, in operation 602, the electronic device may identify whether the fingerprint touches the fingerprint sensor, and a finger touches in the frame guide.

According to an embodiment, if the finger does not touch in the frame guide (no in operation 602), the electronic device may provide an error message, such as "Reposition your finger to fill the inside of the edge with fingerprint" in operation 603. The error message is not limited thereto, and any message to lead to adjust the touch position may be applicable. According to an embodiment, the error message to lead to adjust the touch position is described below in greater detail with reference to FIG. 9A.

According to an embodiment, the electronic device may return to operation 601 after providing the error message.

Figure 8A:
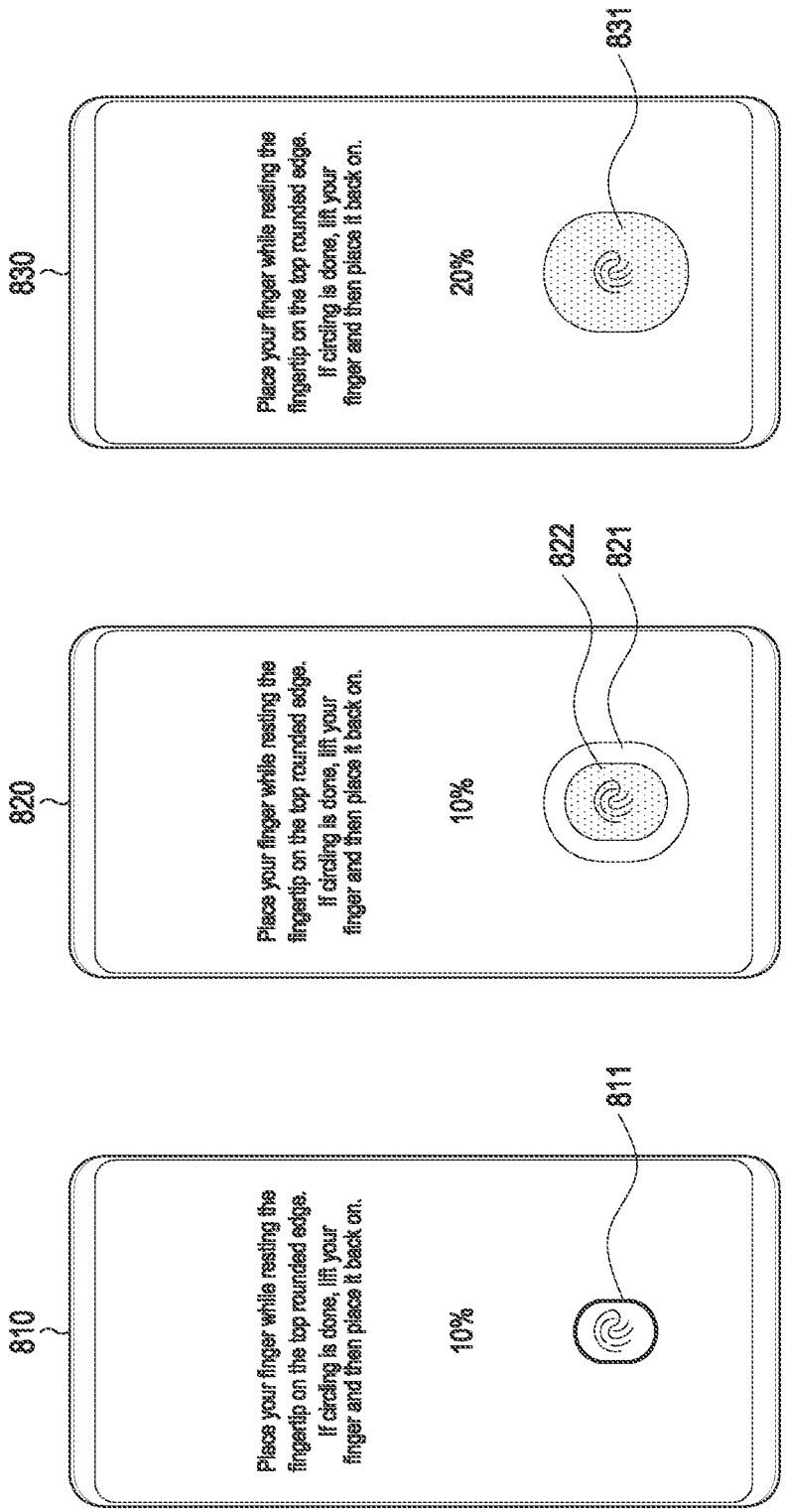
FIG. 8A is a view illustrating a screen including a user interface displaying a partial fingerprint recognition progress by an electronic device, according to an embodiment of the disclosure.
Figure 10A:
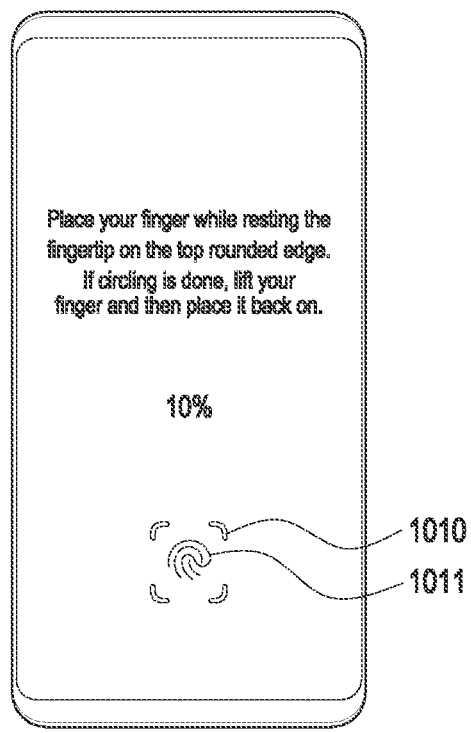
FIG. 10A is a view illustrating a screen including a user interface guiding a touch for partial fingerprint recognition by an electronic device, according to an embodiment of the disclosure.
Figure 10B:
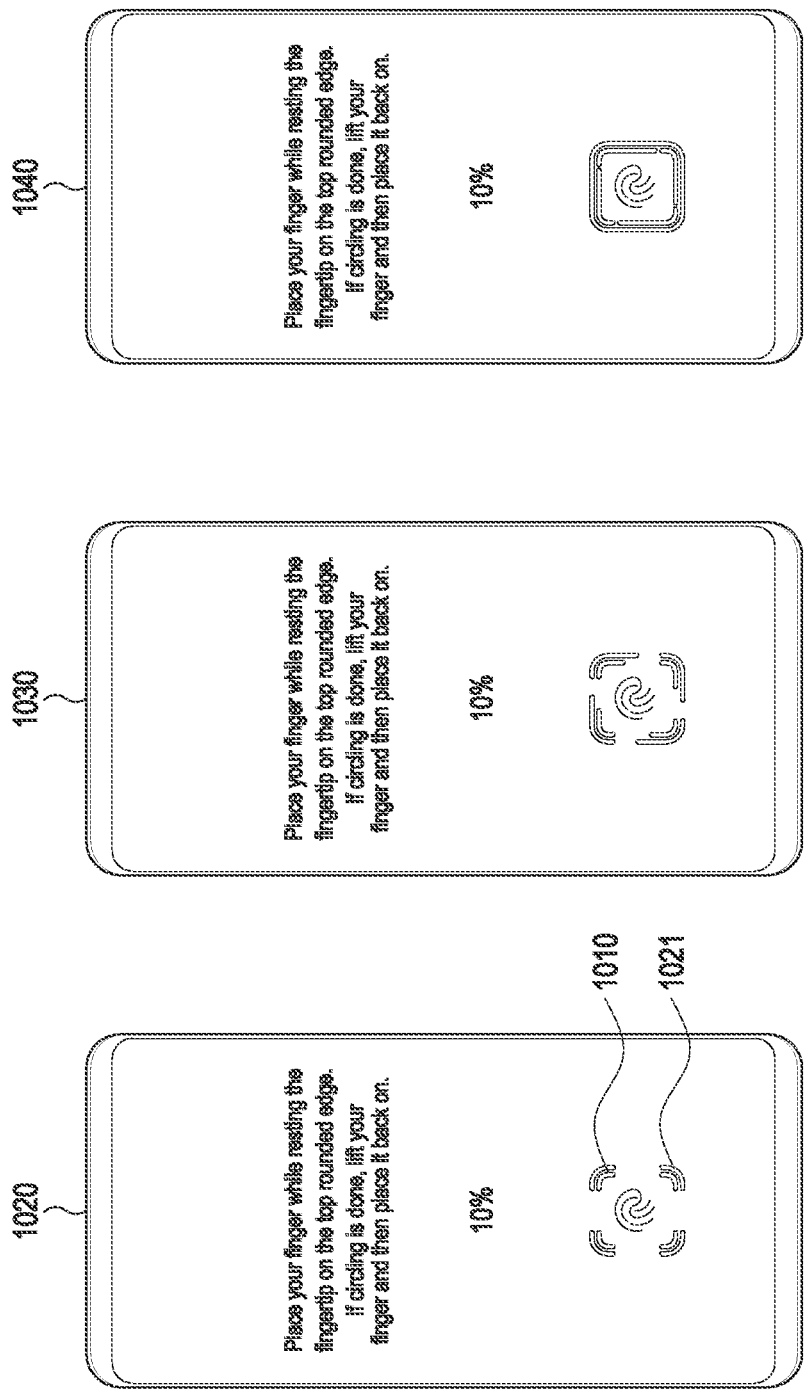
FIG. 10B is a view illustrating a screen including a user interface displaying a partial fingerprint recognition progress by an electronic device, according to an embodiment of the disclosure.
Figure 13:
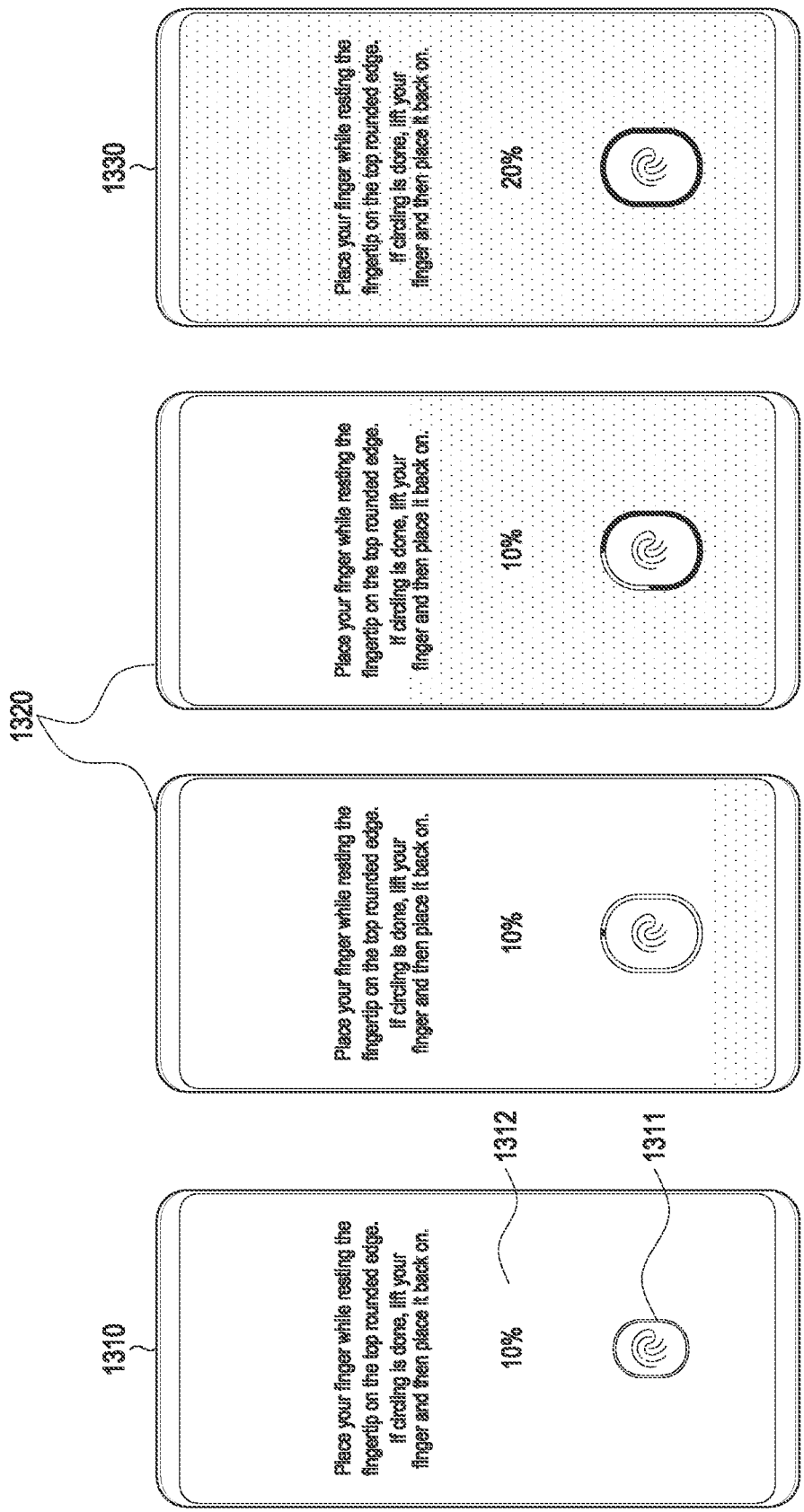
FIG. 13 is a view illustrating a screen displayed in a partial fingerprint recognition process by an electronic device, according to an embodiment of the disclosure.

According to an embodiment, if the finger touches in the frame guide (yes in operation 602), the electronic device may enlarge the guide simultaneously with start of fingerprint recognition, provide a processing effect (e.g., the progress bar 430 of FIG. 4A), and identify whether the user's touch is maintained until processing ends in operation 604. According to an embodiment, the electronic device may display the enlarged guide (e.g., the second user interface 340 of FIG. 3B or the second user interface 410 of FIG. 4A), the processing effect may be an elliptical progress bar shape shown in FIGS. 4A and 4B, or be a form of filling an area as shown in FIG. 8A, a rectangular progress bar shape as shown in FIG. 10B, and/or a form in which the entire screen changes in color as shown in FIG. 13.

According to an embodiment, if the user's touch is not maintained until processing ends (no in operation 604), the electronic device may initialize the processing effect and provide an error message, such as "Fingerprint recognition fails. You lifted finger too early," in operation 605. The error message is not limited thereto, and any message to lead to maintain the touch may be applicable.

According to an embodiment, the error message to lead to maintain the touch is described below in greater detail with reference to FIG. 9B.

According to an embodiment, the electronic device may return to operation 601 after providing the error message.

According to an embodiment, if the user's touch is maintained until processing ends (yes in operation 604), the electronic device may complete recognition of the Nth fingerprint (e.g., Nth partial fingerprint) and increase the entire fingerprint registration progress (%) (e.g., the third user interface 330-1 of FIG. 3D) in operation 606. According to an embodiment, the electronic device may obtain the fingerprint registration progress based on the ratio of the number of recognition-completed partial fingerprints to the number of the plurality of partial fingerprints necessary for one fingerprint registration.

According to an embodiment, in operation 607, the electronic device may identify whether the fingerprint registration progress is 100%. According to an embodiment, if the plurality of partial fingerprints necessary for one fingerprint registration are all recognized, the electronic device may identify that the fingerprint registration progress is 100%.

According to an embodiment, if the fingerprint registration progress is 100% (yes in operation 607, the electronic device may display fingerprint registration complete in operation 608.

According to an embodiment, if the fingerprint registration progress is not 100% (no in operation 607), the electronic device may identify whether the user lifts her finger from the display in operation 609.

According to an embodiment, if the user does not lift her finger from the display (no in operation 609), the electronic device may display "Lift your finger" in operation 6010.

According to an embodiment, the electronic device may proceed to operation 6011 to compare the size of the recognized fingerprint and the size of the touch guide after displaying the message to lift the finger.

According to an embodiment, if the user lifts her finger from the display (yes in operation 609), the electronic device may identify whether the first touching fingerprint was larger or smaller than the touch guide (e.g., guide frame) in operation 6011. According to an embodiment, the electronic device may identify whether the size of the touched fingerprint area is larger or smaller than the size (e.g., horizontal length or vertical length) of the touch guide.

According to an embodiment, if the first touching fingerprint was larger or smaller than the touch guide (yes in operation 6011), the electronic device may adjust the size of the touch guide. According to an embodiment, if the first fingerprint is larger than the touch guide, the electronic device may enlarge the touch guide and, if the first fingerprint is smaller than the touch guide by less than a set ratio, shrink the touch guide.

According to an embodiment, the electronic device may adjust the size of the touch guide and proceed to operation 6015 to change N to a number which is one larger than N.

According to an embodiment, if the first touching fingerprint is not larger or smaller than the touch guide (no in operation 6011), the electronic device may identify whether the first touching fingerprint is tilted to the left or right in operation 6013. According to an embodiment, since the vertical length of the touched area is larger than the horizontal length, if the direction in which the length of the touched area is largest is tilted to the left with respect to the vertical axis, the electronic device may identify that the fingerprint is tilted to the left. According to an embodiment, if the direction in which the length of the touched area is largest is tilted to the right with respect to the vertical axis, the electronic device may identify that the fingerprint is tilted to the right.

According to an embodiment, if the fingerprint is tilted to the left, the electronic device may identify that it is gripped in the left hand and, if tilted to the right, identify that it is gripped in the right hand.

According to an embodiment, if the first touching fingerprint is tilted to the left or right (yes in 6013), the electronic device may adjust the slope of the touch guide in operation 6014. According to an embodiment, if the first touching fingerprint is tilted to the left, the electronic device may adjust the touch guide to tilt to the left as much as the fingerprint is tilted. According to an embodiment, if the first touching fingerprint is tilted to the right, the electronic device may adjust the touch guide to tilt to the right as much as the fingerprint is tilted.

According to an embodiment, since the user registers the fingerprint by touching several times while maintaining the grip on the electronic device, the user may more conveniently make a touch input by tilting the touch guide.

According to an embodiment, the electronic device may adjust the slope of the touch guide and proceed to operation 6015 to change N to a number which is one larger than N.

According to an embodiment, if the Nth touching fingerprint is not tilted to the left or right (no in 6013), the electronic device may change the number which is one larger than N into N and repeat the operations from operation 601 in operation 6015.

Operations 6011 to 6014 are shown and described as included, but may be omitted. According to an embodiment, when operations 6011 to 6014 are performed on the first touch, operations 6011 to 6014 may be omitted for the subsequent touches. According to an embodiment, when operations 6011 to 6014 are omitted, the electronic device may proceed to operation 6015 after the user lifts her finger from the display (yes in operation 609) or operation 6010.

Figure 7:
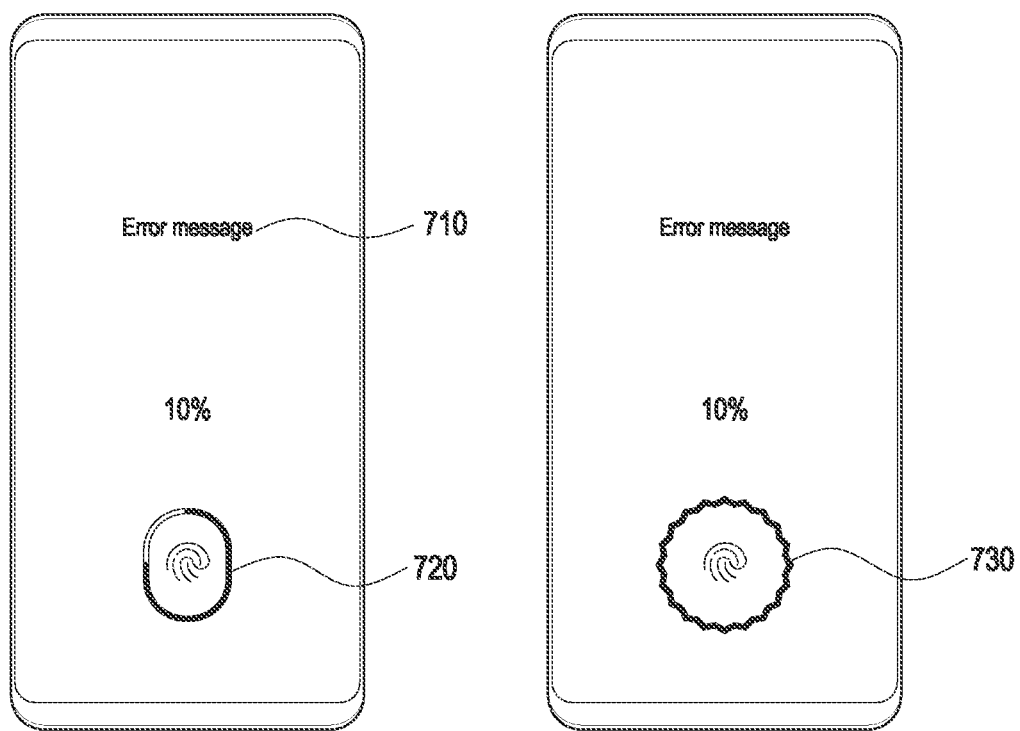
FIG. 7 is a view illustrating a screen displayed when partial fingerprint recognition by an electronic device fails, according to an embodiment of the disclosure.

FIG. 7 is a view illustrating a screen displayed when partial fingerprint recognition by an electronic device fails, according to an embodiment of the disclosure.

Referring to FIG. 7, if an error occurs during partial fingerprint recognition, the electronic device (e.g., the electronic device 101 of FIG. 1 or the processor 120 of FIG. 1) may display a message 710 indicating that the error occurs. According to an embodiment, if an error occurs during partial fingerprint recognition, the electronic device may change the color of the user interface 720 indicating the partial fingerprint recognition rate into a color (e.g., red) corresponding to the recognition error.

According to an embodiment, if an error occurs during partial fingerprint recognition, the electronic device may change the shape of the user interface 730 into a shape (e.g., a gear shape) corresponding to the error.

As such, if an error occurs during partial fingerprint recognition, the electronic device, according to an embodiment of the disclosure, may change the color and/or shape of the user interface corresponding to the partial fingerprint recognition rate, intuitively informing the user that an error occurs in the partial fingerprint recognition operation.

Figure 8B:
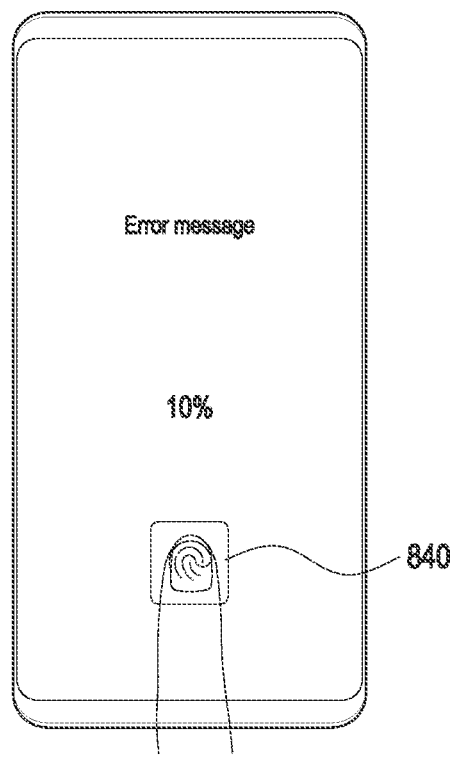
FIG. 8B is a view illustrating a screen displayed when partial fingerprint recognition by an electronic device fails, according to an embodiment of the disclosure.
Figure 10C:
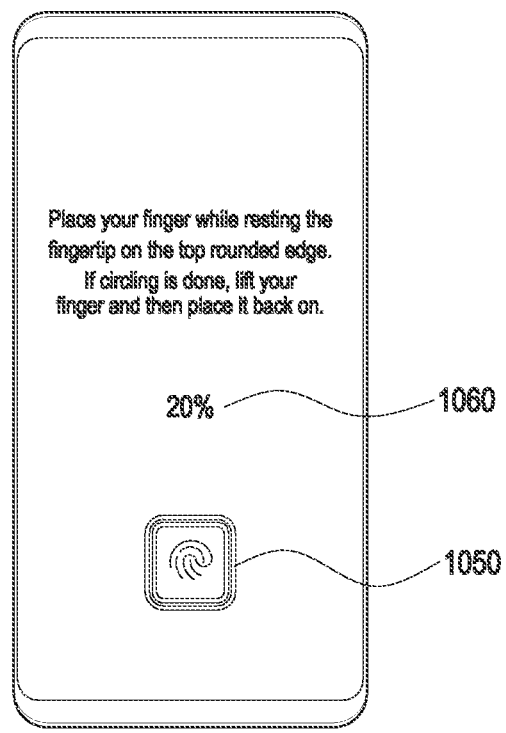
FIG. 10C is a view illustrating a screen displayed if partial fingerprint recognition by an electronic device is complete, according to an embodiment of the disclosure.

Although the partial fingerprint recognition rate is shown and described as an elliptical progress bar shape, it is not limited thereto, but may be shown in a form in which the user interface is gradually filled as shown in FIGS. 8A and 8B. According to an embodiment, the partial fingerprint recognition rate may also be shown in a rectangular progress bar shape as shown in FIGS. 10A, 10B, and 10C. According to an embodiment, the partial fingerprint recognition rate may also be shown in a form in which the entire screen is gradually filled as shown in FIG. 13.

FIG. 8A is a view illustrating a screen including a user interface displaying a partial fingerprint recognition progress by an electronic device, according to an embodiment of the disclosure.

Referring to FIG. 8A, upon receiving a user input for fingerprint registration, the electronic device (e.g., the electronic device 101 of FIG. 1 or the processor 120 of FIG. 1) may display a screen 810 for fingerprint registration. According to an embodiment, the screen 810 for fingerprint registration may include a first user interface 811 leading to the position of the user's touch input, a guide message for fingerprint registration, and a third user interface indicating the fingerprint registration progress.

According to an embodiment, upon receiving the user's touch, the electronic device may display a screen 820 including a second user interface 821. Although the user's finger is omitted from FIG. 8A for convenience of description, FIG. 8A illustrates a screen displayed in a context where the user's touch is maintained.

According to an embodiment, the second user interface 821 is larger than the first user interface 811, and a progress effect 822 to fill the area from the center portion of the second user interface 821 to correspond to the partial fingerprint recognition rate may be displayed.

According to an embodiment, if the partial fingerprint recognition rate is 100%, the electronic device may display a screen 830 including a second user interface 831 fully filling the area.

FIG. 8B is a view illustrating a screen displayed when partial fingerprint recognition by an electronic device fails, according to an embodiment of the disclosure.

Referring to FIG. 8B, if an error occurs during partial fingerprint recognition, the electronic device (e.g., the electronic device 101 of FIG. 1 or the processor 120 of FIG. 1) may change the shape of the user interface 840 indicating the recognition rate of partial fingerprint from the elliptical shape of FIG. 8A to a shape (e.g., a rectangular shape) corresponding to the error.

According to an embodiment, if an error occurs during partial fingerprint recognition, the electronic device may change the color in which the reshaped user interface 840 is filled into a color (e.g., red) corresponding to the recognition error.

According to an embodiment, if an error occurs during partial fingerprint recognition, the electronic device may display a message indicating that the error occurs.

As such, if an error occurs during partial fingerprint recognition, the electronic device, according to an embodiment of the disclosure may change the color and/or shape of the user interface corresponding to the partial fingerprint recognition rate, intuitively informing the user that an error occurs in the partial fingerprint recognition operation.

Figure 9A:
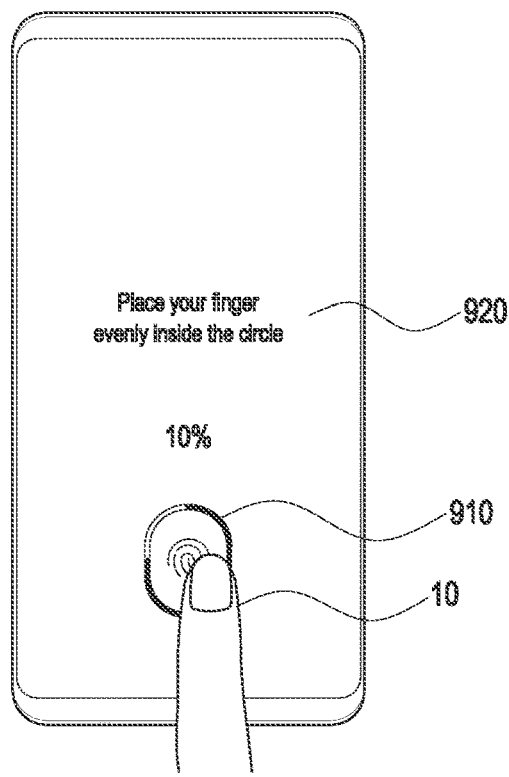
FIG. 9A is a view illustrating a screen displayed when partial fingerprint recognition by an electronic device fails, according to an embodiment of the disclosure.

FIG. 9A is a view illustrating a screen displayed when partial fingerprint recognition by an electronic device fails, according to an embodiment of the disclosure.

Referring to FIG. 9A, upon receiving the user's touch, the electronic device (e.g., the electronic device 101 of FIG. 1 or the processor 120 of FIG. 1) may display a second user interface 910 for indicating the partial fingerprint recognition rate, a guide message 920 for fingerprint registration, and a third user interface indicating the fingerprint registration progress. According to an embodiment, the second user interface 910 may be one produced by enlarging the first user interface based on reception of a touch with the first user interface for leading to the touch position displayed.

According to an embodiment, when the user's finger touches outside the second user interface 910 to touch less than a set proportion of the entire area of the second user interface 910, the electronic device may determine that an error occurs in partial fingerprint recognition. According to an embodiment, the electronic device may compare the area touched on the display (e.g., the display module 160 of FIG. 1) and the area of the display corresponding to the fingerprint sensor (e.g., the sensor module 176 of FIG. 1). According to an embodiment, if the size of the area duplicated with the touched area on the area of the display corresponding to the fingerprint sensor is less than a preset proportion of the size of the area of the display corresponding to the fingerprint sensor, the electronic device may determine that an error occurs in partial fingerprint recognition.

According to an embodiment, the electronic device may display a guide message 920 (e.g., error message) to lead to adjust the touch position. For example, the electronic device may display a guide message 920 to lead to adjust the touch position, such as "Place your finger evenly inside the circle."

Figure 9B:
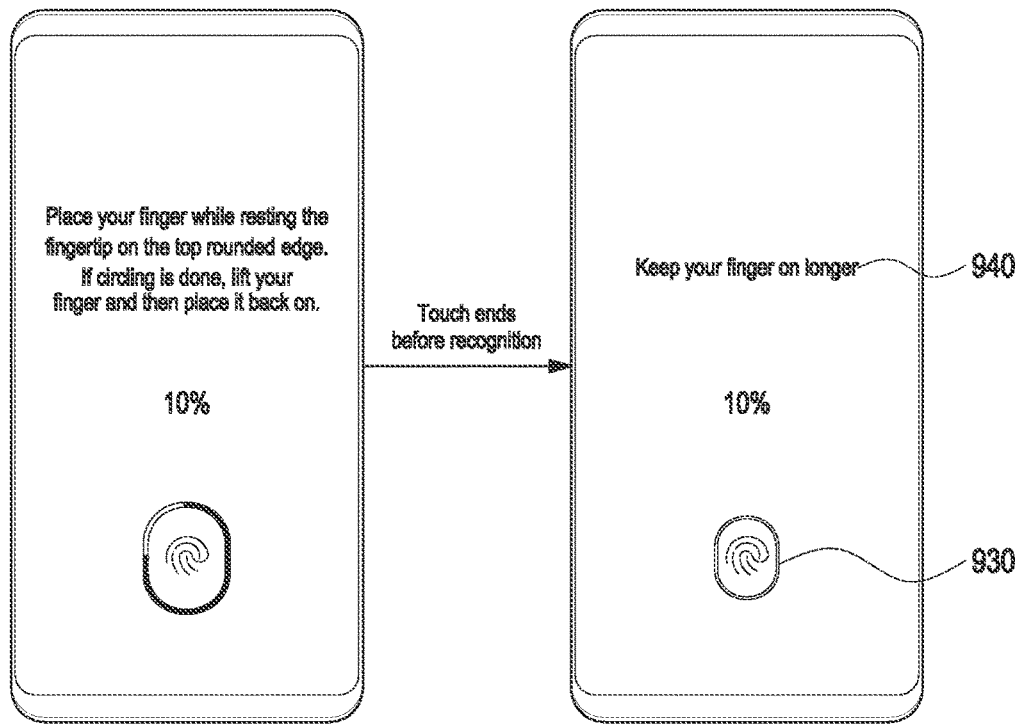
FIG. 9B is a view illustrating a screen displayed when partial fingerprint recognition by an electronic device fails, according to an embodiment of the disclosure.

FIG. 9B is a view illustrating a screen displayed when partial fingerprint recognition by an electronic device fails, according to an embodiment of the disclosure.

Referring to FIG. 9B, upon receiving the user's touch, the electronic device (e.g., the electronic device 101 of FIG. 1 or the processor 120 of FIG. 1) may display a second user interface for indicating the partial fingerprint recognition rate, a guide message for fingerprint registration, and a third user interface indicating the fingerprint registration progress. According to an embodiment, the second user interface may be one produced by enlarging the first user interface based on reception of a touch with the first user interface for leading to the touch position displayed.

According to an embodiment, if the touch is released before partial fingerprint recognition is complete while the partial fingerprint is recognized as the touch is maintained, the electronic device may determine that an error occurs in the partial fingerprint recognition.

According to an embodiment, the electronic device may display a first user interface 930 produced by shrinking the second user interface based on release of the touch. According to an embodiment, the first user interface 930 may be one to lead to the touch position.

According to an embodiment, the electronic device may display a guide message 940 (e.g., error message) to lead to maintain the touch. For example, the electronic device may display a guide message 940 to lead to maintain the touch, such as "Keep your finger on longer."

FIG. 10A is a view illustrating a screen including a user interface guiding a touch for partial fingerprint recognition by an electronic device, according to an embodiment of the disclosure.

Referring to FIG. 10A, the electronic device (e.g., the electronic device 101 of FIG. 1 or the processor 120 of FIG. 1) may display a screen for fingerprint registration. According to an embodiment, the screen for fingerprint registration may include a first user interface 1010 to indicate the touch position, a guide message for fingerprint registration, and a third user interface to indicate the fingerprint registration progress. According to an embodiment, the first user interface 1010 may include a user interface 1011 corresponding to the position of the fingerprint sensor.

According to an embodiment, the first user interface 1010 may be a rounded rectangular shape. According to an embodiment, the first user interface 1010 may be a shape in which only four corners of a rounded rectangle are displayed.

FIG. 10B is a view illustrating a screen including a user interface displaying a partial fingerprint recognition progress by an electronic device, according to an embodiment of the disclosure. According to an embodiment, although the user's finger is omitted in FIG. 10B, it may be a screen displayed with the touch by the user's finger maintained.

Referring to FIG. 10B, upon receiving a user touch, the electronic device may display a screen 1020 including a second user interface 1021 larger than a first user interface 1010. According to an embodiment, the second user interface 1021 may have a shape surrounding the first user interface 1010. According to an embodiment, the second user interface 1021 may be a shape in which only four corners of a rounded rectangle larger than the first user interface 1010 are displayed. According to an embodiment, the first user interface 1010 and the second user interface 1021 may have the same color or different colors.

According to an embodiment, if partial fingerprint recognition proceeds based on maintaining the touch, the electronic device may display a screen 1030 in which the length of the second user interface is increased to correspond to the increase in partial fingerprint recognition rate. For example, the electronic device may increase the length of the second user interface in a form of completing the rounded rectangle.

According to an embodiment, the electronic device may increase the length of the first user interface, along with the second user interface, to correspond to the increase in partial fingerprint recognition rate.

According to an embodiment, if the partial fingerprint recognition is complete, the electronic device may display a screen 1040 including a second user interface shaped as a rounded rectangle. According to an embodiment, the screen 1040 including the rounded rectangle-shaped second user interface may include a first user interface shaped as a rounded rectangle completed based on completion of partial fingerprint recognition.

FIG. 10C is a view illustrating a screen displayed if partial fingerprint recognition by an electronic device is complete, according to an embodiment of the disclosure.

Referring to FIG. 10C, the electronic device may display a second user interface 1050 indicating that partial fingerprint recognition is complete and display a fingerprint registration progress 1060 increased based on partial fingerprint recognition. For example, as shown in FIGS. 10A and 10B, the fingerprint registration progress which is 10% may be increased to 20% based on completion of partial fingerprint recognition.

Figure 11:
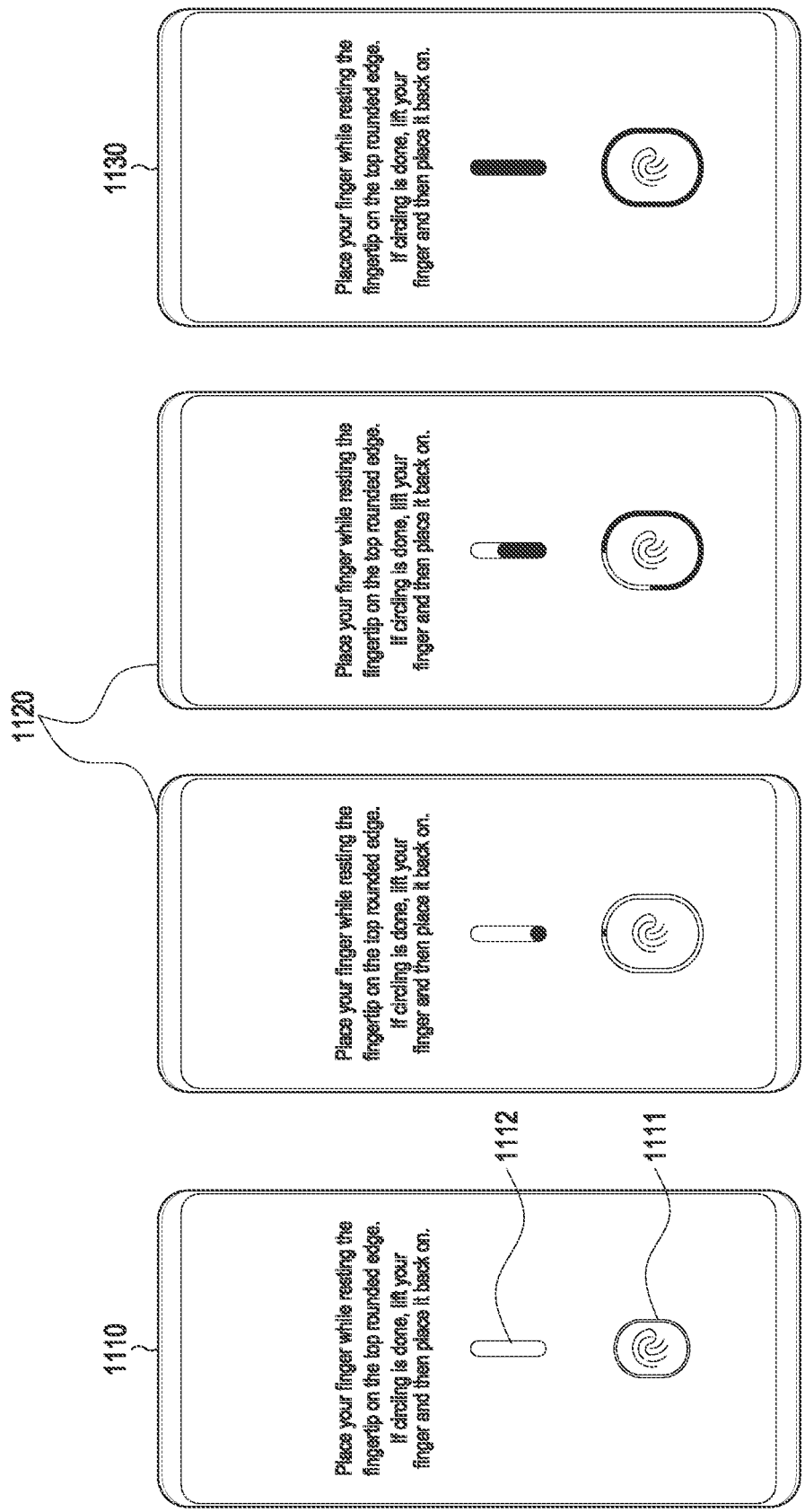
FIG. 11 is a view illustrating a screen displayed in a partial fingerprint recognition process by an electronic device, according to an embodiment of the disclosure.

FIG. 11 is a view illustrating a screen displayed in a partial fingerprint recognition process by an electronic device, according to an embodiment of the disclosure.

Referring to FIG. 11, the electronic device (e.g., the electronic device 101 of FIG. 1 or the processor 120 of FIG. 1) may display a screen 1110 for fingerprint registration. According to an embodiment, the screen 1110 for fingerprint registration may include a first user interface 1111 to lead to the position of the user's touch input, a guide message for fingerprint registration, and a second user interface 1112 displaying the partial fingerprint recognition rate. According to an embodiment, the screen 1110 for fingerprint registration may further include a third user interface indicating the fingerprint registration progress.

According to an embodiment, upon receiving the user's touch on the first user interface 1111, the electronic device may display a screen 1120 including a third user interface including a progress effect corresponding to the partial fingerprint recognition rate. According to an embodiment, the electronic device may display a screen 1120 including a bar-shaped third user interface in which a gauge continuously increases vertically to correspond to the partial fingerprint recognition rate. According to an embodiment, the gauge may stepwise increase.

According to an embodiment, if partial fingerprint recognition is complete, the electronic device may display a screen 1130 including a bar-shaped third user interface in which the gauge is fully filled.

According to an embodiment, upon receiving the user's touch on the first user interface 1111, the electronic device may enlarge the first user interface and provide a progress effect corresponding to the partial fingerprint recognition rate through the border of the enlarged first user interface as shown in FIGS. 4A and 4B.

As such, as the partial fingerprint recognition rate is displayed through an area other than the area touched by the user, the user may more easily identify the partial fingerprint recognition rate. Thus, the user may maintain the touch for the time necessary for partial fingerprint recognition, allowing fingerprint registration to be more effectively performed.

Figure 12:
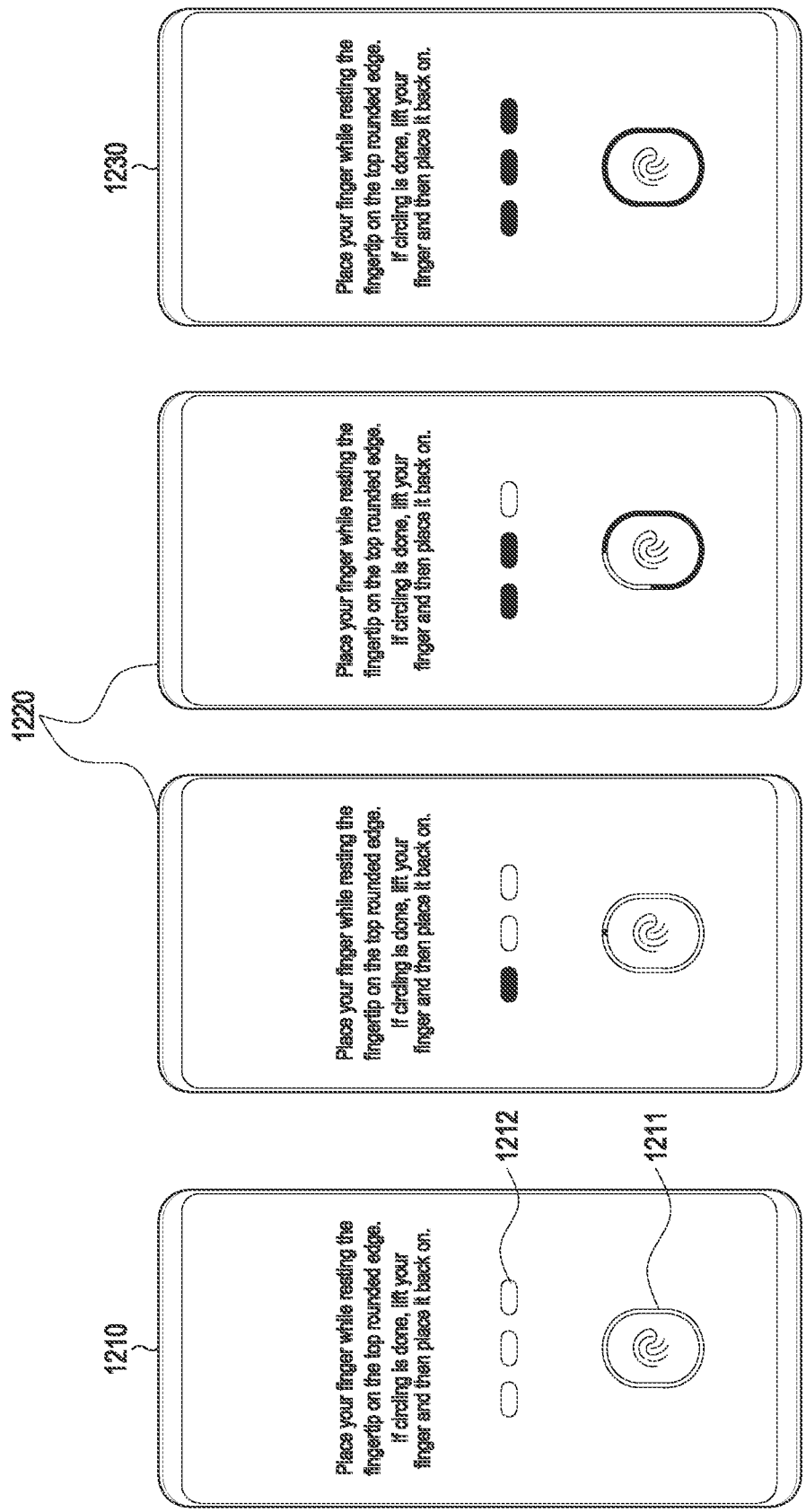
FIG. 12 is a view illustrating a screen displayed in a partial fingerprint recognition process by an electronic device, according to an embodiment of the disclosure.

FIG. 12 is a view illustrating a screen displayed in a partial fingerprint recognition process by an electronic device, according to an embodiment of the disclosure.

Referring to FIG. 12, the electronic device (e.g., the electronic device 101 of FIG. 1 or the processor 120 of FIG. 1) may display a screen 1210 for fingerprint registration. According to an embodiment, the screen 1210 for fingerprint registration may include a first user interface 1211 to lead to the position of the user's touch input, a guide message for fingerprint registration, and a second user interface 1212 displaying the partial fingerprint recognition rate. According to an embodiment, the screen 1210 for fingerprint registration may further include a third user interface indicating the fingerprint registration progress.

According to an embodiment, upon receiving the user's touch on the first user interface 1211, the electronic device may display a screen 1220 including a third user interface including a progress effect corresponding to the partial fingerprint recognition rate. According to an embodiment, the electronic device may display a screen 1220 including a bar-shaped third user interface in which a gauge stepwise increases horizontally to correspond to the partial fingerprint recognition rate. According to an embodiment, the gauge may be in the form of a continuously increasing bar.

According to an embodiment, if partial fingerprint recognition is complete, the electronic device may display a screen 1230 including a bar-shaped third user interface in which the gauge is fully filled.

According to an embodiment, upon receiving the user's touch on the first user interface 1211, the electronic device may enlarge the first user interface and provide a progress effect corresponding to the partial fingerprint recognition rate through the border of the enlarged first user interface as shown in FIGS. 4A and 4B.

As such, as the partial fingerprint recognition rate is displayed through an area other than the area touched by the user, the user may more easily identify the partial fingerprint recognition rate. Thus, the user may maintain the touch for the time necessary for partial fingerprint recognition, allowing fingerprint registration to be more effectively performed.

FIG. 13 is a view illustrating a screen displayed in a partial fingerprint recognition process by an electronic device, according to an embodiment of the disclosure.

Referring to FIG. 13, the electronic device (e.g., the electronic device 101 of FIG. 1 or the processor 120 of FIG. 1) may display a screen 1310 for fingerprint registration. According to an embodiment, the screen 1310 for fingerprint registration may include a first user interface 1311 to lead to the position of the user's touch input, a guide message for fingerprint registration, and a third user interface 1312 indicating the fingerprint registration progress.

According to an embodiment, upon receiving the user's touch on the first user interface 1311, the electronic device may display a screen 1320 including a progress effect corresponding to the partial fingerprint recognition rate. According to an embodiment, the electronic device may provide a progress effect in the form of changing the color of the area in the proportion corresponding to the partial fingerprint recognition rate of the entire screen. According to an embodiment, as the partial fingerprint recognition rate increases, the area in which the screen color is changed may be enlarged.

According to an embodiment, if partial fingerprint recognition is complete, a screen 1330 which is entirely changed in color may be displayed.

According to an embodiment, upon receiving the user's touch on the first user interface 1311, the electronic device may enlarge the first user interface and provide a progress effect corresponding to the partial fingerprint recognition rate through the border of the enlarged first user interface as shown in FIGS. 4A and 4B.

According to an embodiment, although FIG. 13 illustrates that the third user interface 1312 indicating the fingerprint registration progress is maintained as 10% while partial fingerprint is recognized, in actual implementation, the third user interface 1312 indicating the fingerprint registration progress based on the partial fingerprint recognition degree may be changed to gradually increase, e.g., to 10%, 12%, or 12%, and if partial fingerprint recognition is complete, the third user interface 1312 indicating the fingerprint registration progress may be displayed as 20%.

As such, as the partial fingerprint recognition rate is displayed through an area other than the area touched by the user, the user may more easily identify the partial fingerprint recognition rate. Thus, the user may maintain the touch for the time necessary for partial fingerprint recognition, allowing fingerprint registration to be more effectively performed.

Figure 14:
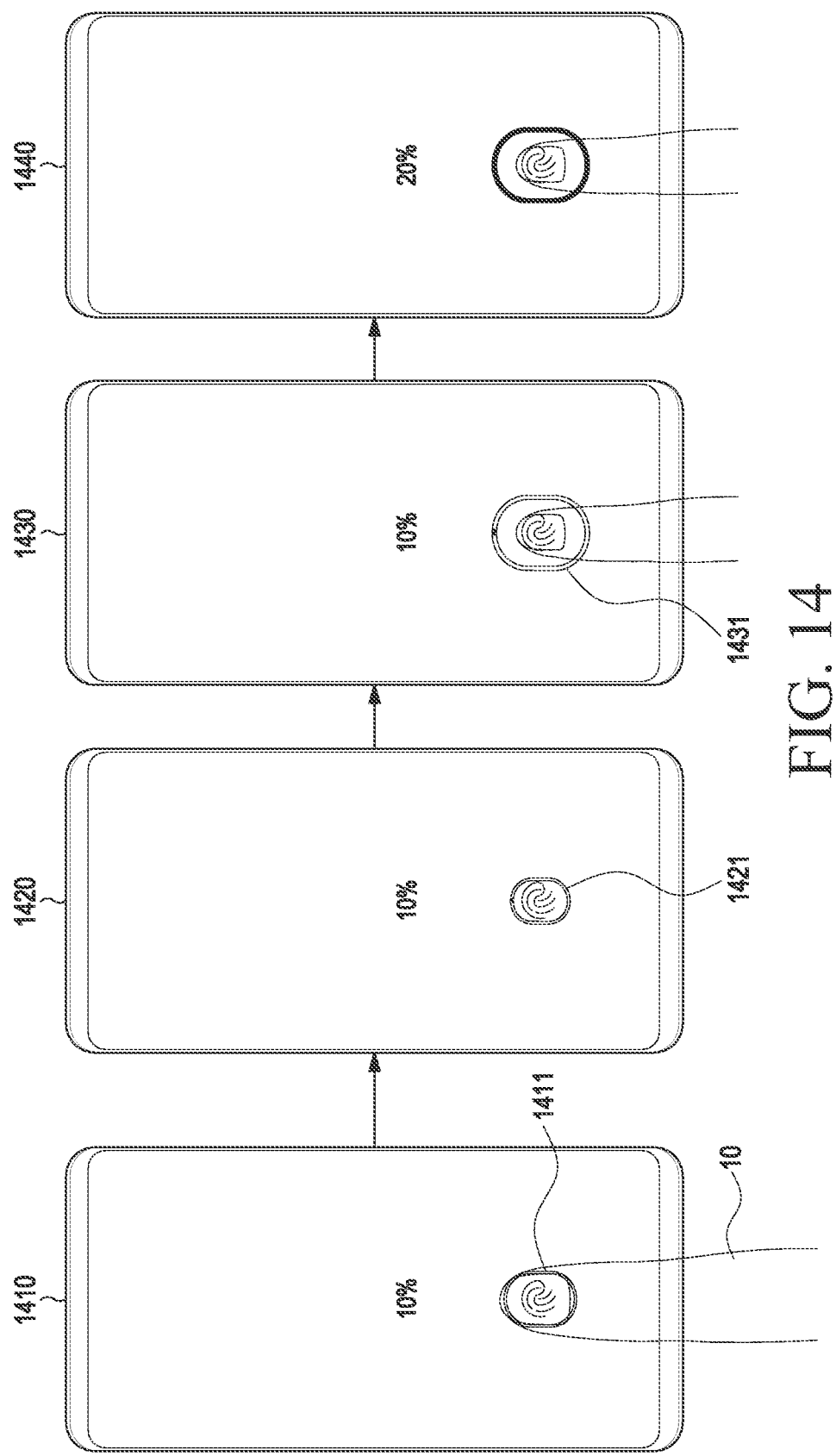
FIG. 14 is a view illustrating an operation of adjusting the size of a user interface for guiding partial fingerprint recognition based on the size of a touch area by an electronic device, according to an embodiment of the disclosure.

FIG. 14 is a view illustrating an operation of adjusting the size of a user interface for guiding partial fingerprint recognition based on the size of a touch area by an electronic device, according to an embodiment of the disclosure.

Referring to FIG. 14, upon receiving the user's touch, the electronic device (e.g., the electronic device 101 of FIG. 1 or the processor 120 of FIG. 1) may display a screen 1410 including a second user interface 1411 produced by enlarging the first user interface leading to the position of the touch. According to an embodiment, the second user interface 1411 may display the partial fingerprint recognition rate. According to an embodiment, the second user interface 1411 may be larger than the first user interface and have a different shape from the first user interface.

According to an embodiment, when the second user interface 1411 is hidden by the user's large or thick finger, the user is unable to identify the partial fingerprint recognition rate and may thus have difficulty in knowing the touch duration necessary to normally perform partial fingerprint recognition.

According to an embodiment, if including at least a portion of the area where the second user interface 1411 is displayed and being larger than a preset size, the electronic device may determine that the second user interface 1411 should be resized.

According to an embodiment, if partial fingerprint recognition is complete and then the touch is released with the second user interface 1411 in the existing size displayed, the electronic device may display a screen 1420 including a first user interface 1421 smaller in size than the second user interface 1411. According to an embodiment, the first user interface 1421 may differ in position and/or size from the first user interface displayed before the touch is received. According to an embodiment, the electronic device may increase the moving interval of the first user interface as much as the size of the second user interface is increased. Thus, it is possible to reduce duplicated partial fingerprints.

According to an embodiment, upon receiving the user's touch through the first user interface 1421, the electronic device may display a screen 1430 including an enlarged second user interface 1431. According to an embodiment, the second user interface 1431 may be one enlarged based on the touch area before the touch is released.

According to an embodiment, the electronic device may provide a progress effect of the second user interface as the partial fingerprint recognition rate increases.

Although only operations when the user's finger is large or thick are described above, according to an embodiment, when the size of the user's finger is smaller or thinner than the size of the second user interface by less than a preset proportion, the electronic device may reduce the size of the second user interface based on the user's touch area.

Figure 15:
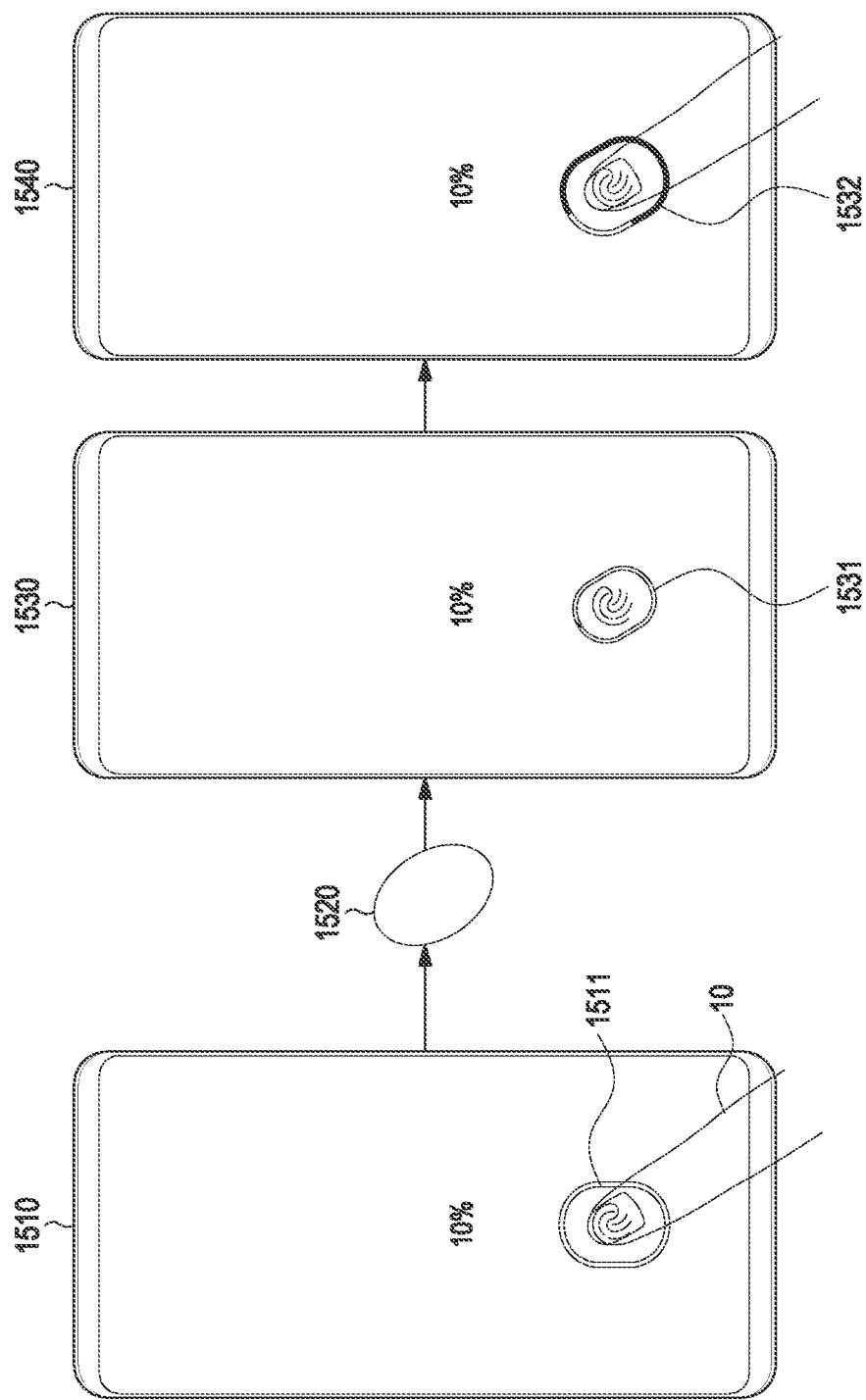
FIG. 15 is a view illustrating an operation of changing the shape of a user interface for guiding partial fingerprint recognition based on the shape of a touch area by an electronic device, according to an embodiment of the disclosure.

FIG. 15 is a view illustrating an operation of changing the shape of a user interface for guiding partial fingerprint recognition based on the shape of a touch area by an electronic device, according to an embodiment of the disclosure.

Referring to FIG. 15, upon receiving the user's touch, the electronic device (e.g., the electronic device 101 of FIG. 1 or the processor 120 of FIG. 1) may display a screen 1510 including a second user interface 1511 produced by enlarging the first user interface leading to the position of the touch. According to an embodiment, the second user interface 1511 may display the partial fingerprint recognition rate.

According to an embodiment, the electronic device may identify the shape 1520 of the touch area. According to an embodiment, the electronic device may obtain the direction and degree at which the direction in which the length of the touch area is largest is tilted from the vertical axis.

According to an embodiment, if partial fingerprint recognition is complete and then the touch is released with the second user interface 1511 in the existing size displayed, the electronic device may display a first user interface 1531 smaller in size than the second user interface 1511. According to an embodiment, the first user interface 1531 may differ in position from the first user interface displayed before the touch is received. According to an embodiment, the first user interface 1531 may differ in shape from the first user interface displayed before the touch is received. For example, the first user interface 1531 may have a shape tilted more than the first user interface displayed before the touch is received based on the shape 1520 of the touch area.

According to an embodiment, upon receiving the user's touch through the first user interface 1531, the electronic device may display a screen 1540 including an enlarged second user interface 1532. According to an embodiment, the second user interface 1532 may be one enlarged based on the touch area before the touch is released.

According to an embodiment, the electronic device may provide a progress effect of the second user interface as the partial fingerprint recognition rate increases.

As such, it is possible to allow the user to more easily make a plurality of touches for fingerprint registration while gripping the electronic device by changing the shape of the touch-leading user interface and/or the user interface indicating the partial fingerprint recognition rate based on the shape of the touch area.

Figure 16A:
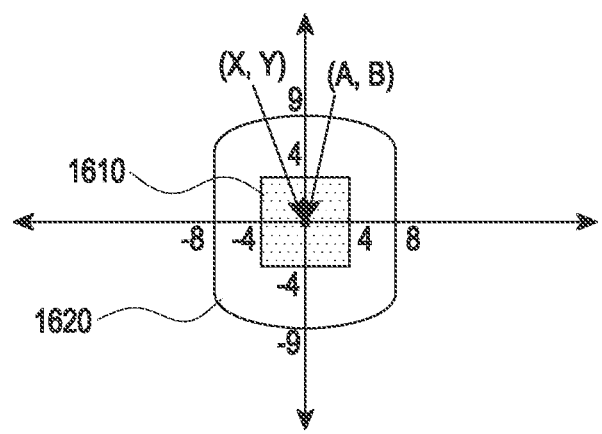
FIG. 16A is a view illustrating positions of a fingerprint sensor of an electronic device and a user interface for guiding partial fingerprint recognition, according to an embodiment of the disclosure.

FIG. 16A is a view illustrating positions of a fingerprint sensor of an electronic device and a user interface for guiding partial fingerprint recognition, according to an embodiment of the disclosure.

Referring to FIG. 16A, the electronic device (e.g., the electronic device 101 of FIG. 1 or the processor 120 of FIG. 1) may identify the reference coordinates (X, Y) of the area 1610 corresponding to the fingerprint sensor and the reference coordinates (A, B) of the user interface 1620 leading to a touch. According to an embodiment, the reference coordinates (X, Y) of the area 1610 corresponding to the fingerprint sensor may be a center point of the area 1610 corresponding to the fingerprint sensor, and the reference coordinates (A, B) of the user interface 1620 leading to a touch may be a center point of the user interface 1620 leading to a touch.

According to an embodiment, at the time when fingerprint registration starts, the reference coordinates (X, Y) of the area 1610 corresponding to the fingerprint sensor and the reference coordinates (A, B) of the user interface 1620 leading to a touch may be (0, 0).

For convenience of description, it is assumed that the horizontal length of the area 1610 corresponding to the fingerprint sensor is 8 mm, and the vertical length is 8 mm, and the horizontal length of the user interface 1620 leading to a touch is 16 mm, and the vertical length is 18 mm, but is not limited thereto.

According to an embodiment, the intersections of the border of the area 1610 corresponding to the fingerprint sensor and the X axis and Y axis may be (4, 0), (−4, 0), (0, 4), and (0, −4).

According to an embodiment, the intersections of the borders of the user interface 1620 leading to a touch and the X axis and Y axis may be (8, 0), (−8, 0), (0, 9), and (0, −9).

According to an embodiment, since the position of the fingerprint sensor is not varied, the position of the area 1610 corresponding to the fingerprint sensor may be maintained, and the position of the touch-leading user interface may be moved to recognize several partial fingerprints of the fingerprint.

Figure 16B:
FIG. 16B is a view illustrating a repositioning of a user interface for guiding partial fingerprint recognition by an electronic device, according to an embodiment of the disclosure.
Figure 16B:
Figure 16B:
Figure 16B:
Figure 16B:
Figure 16B:
Figure 16B:
Figure 16B:
Figure 16B:

FIG. 16B is a view illustrating a repositioning of a user interface for guiding partial fingerprint recognition by an electronic device, according to an embodiment of the disclosure.

Referring to FIG. 16B, if a fingerprint registration process starts, a user interface may be disposed to recognize the partial fingerprint in the center of the fingerprint. For example, the reference coordinates (A, B) of the touch-leading user interface may be the same as the reference coordinates (X, Y) of the area corresponding to the fingerprint sensor.

According to an embodiment, the electronic device may determine the size and moving interval of the touch-leading user interface considering the size of the fingerprint sensor and a normal fingerprint size and move the touch-leading user interface.

According to an embodiment, the order of moving the touch-leading user interface may be preset as shown in FIG. 16B, but is not limited thereto.

According to an embodiment, when fingerprint registration is not complete even when all the areas are touched once, the center portion which is an area normally touched more frequently may be additionally registered, and if a duplicate occurs, it may be moved to an arbitrary position.

According to an embodiment, for the touch-leading user interface, the user interface moving interval may be reduced when partial touch which occurs as a sufficient area of the fingerprint sensor is not touched based on the size of the finger is made a set number of times or more. According to an embodiment, the moving interval may be set based on the horizontal and vertical lengths of the fingerprint sensor or be determined considering the partial touch error area recognized by the fingerprint sensor and the horizontal-vertical ratio of the user interface.

According to an embodiment, the user interface moving interval may be adjusted (reduced) when it is moved according to a predetermined interval, but a set number of partial touch errors or more errors occur, or fingerprint registration is not complete even after all of the plurality of partial fingerprints are recognized. According to an embodiment, the electronic device may increase the user interface moving interval when similar partial fingerprints are repeatedly recognized.

For example, when the size of the fingerprint sensor is 8 mm×8 mm, and the size of the touch-leading user interface is 16 mm×18 mm, the moving area of the user interface may be determined as the value obtained by dividing the horizontal length of the user interface by the horizontal length of the fingerprint sensor is 16/8=2, or by adding 1 when the remainder is 0 considering a partial duplicate and, if there is no remainder, rounding up. For example, the moving area of the user interface is defined as three horizontal sections and three vertical sections.

According to an embodiment, in touching a total of nine sections, considering the partial touch recognition area of the fingerprint sensor, the height/width ratio of the fingerprint sensor may be defined as 1/2.67, and the moving interval (offset) may be calculated as 3 mm.

According to an embodiment, as shown in FIG. 16B, as the touch-leading user interface moves by 3 mm horizontally and 3 mm vertically, nine partial fingerprints may be obtained.

According to an embodiment, when fingerprint registration is not complete even after the nine partial fingerprints are recognized, the moving interval may be reduced (e.g., to 2 mm), and partial fingerprints may be recognized again.

Figure 17:
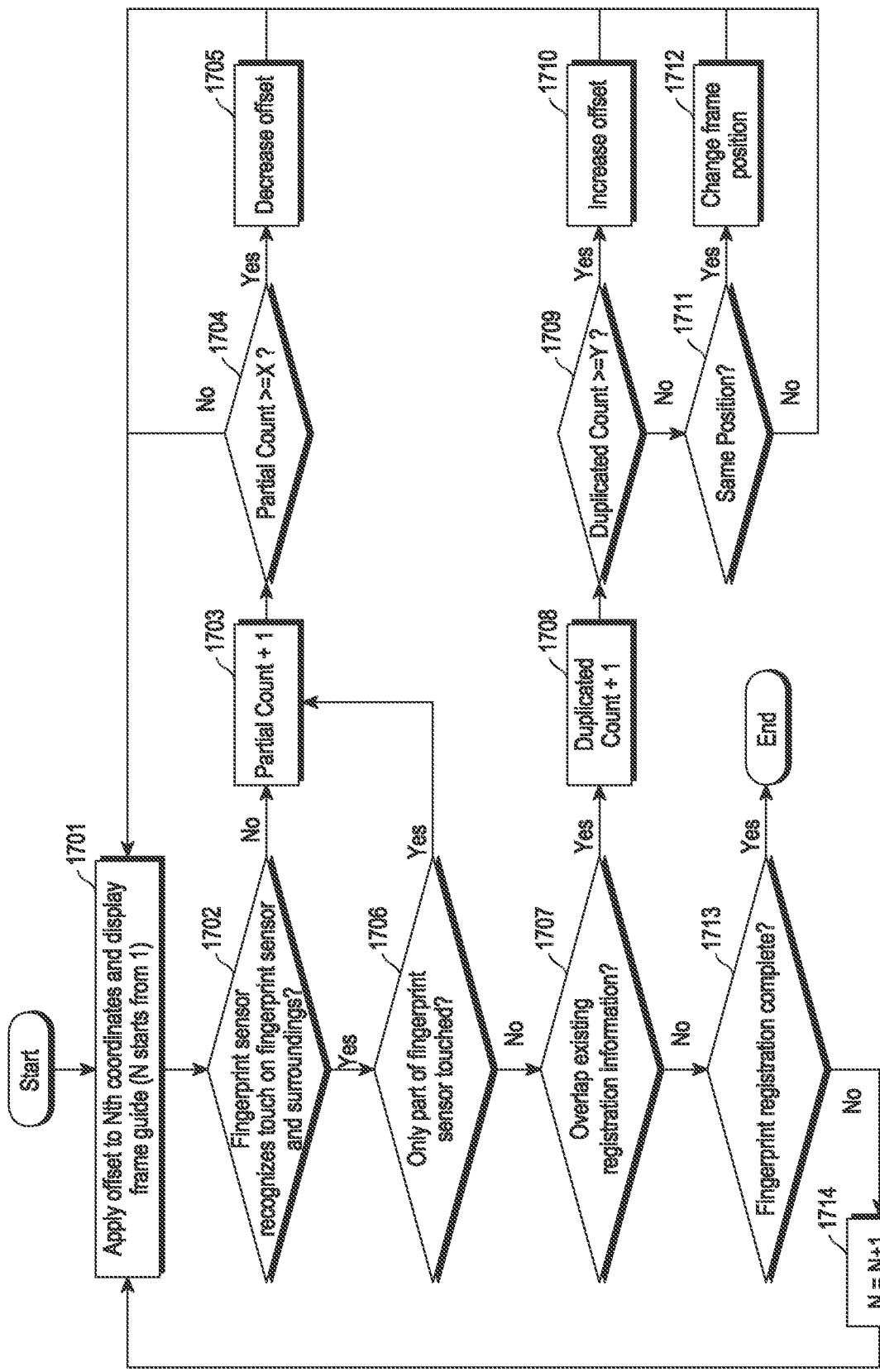
FIG. 17 is a flowchart illustrating an operation of adjusting a repositioning interval of a user interface for guiding partial fingerprint recognition by an electronic device, according to an embodiment of the disclosure.

FIG. 17 is a flowchart illustrating an operation of adjusting a repositioning interval of a user interface for guiding partial fingerprint recognition by an electronic device, according to an embodiment of the disclosure.

Referring to FIG. 17, in operation 1701, the electronic device (e.g., the electronic device 101 of FIG. 1 or the processor 120 of FIG. 1) may display a frame guide (e.g., the first user interface 310 of FIG. 3A) by applying the moving interval (offset) to the Nth coordinates. According to an embodiment, N may start from 1.

According to an embodiment, in operation 1702, the electronic device may identify whether the fingerprint sensor recognizes a touch when the touch is detected at and around the fingerprint sensor. According to an embodiment, if the touch is detected, and there is a value recognized by the fingerprint sensor, the electronic device may identify that it is recognized by the fingerprint sensor.

According to an embodiment, if the fingerprint sensor does not recognize it upon touch detection (no in 1702), the electronic device may add the partial count by 1 in operation 1703. According to an embodiment, the partial count may mean the number of partial touches.

According to an embodiment, in operation 1704, the electronic device may identify whether the partial count is preset X or more. According to an embodiment, if the partial count is preset X or more (yes in 1704), the electronic device may reduce the moving interval (offset) in operation 1705. According to an embodiment, the electronic device may reduce the moving interval and then return to operation 1701.

According to an embodiment, if the partial count is less than preset X (no in 1704), the electronic device may return to operation 1701.

According to an embodiment, if the fingerprint sensor recognizes it upon touch detection (yes in 1702), the electronic device may identify whether only a portion of the fingerprint sensor has been touched in operation 1706. According to an embodiment, if the duplicated area of the touched area upon touch detection and the area corresponding to the fingerprint sensor is less than a preset area, the electronic device may identify that only a portion of the fingerprint sensor has been touched.

According to an embodiment, upon identifying that only a portion of the fingerprint sensor has been touched (yes in 1706), the electronic device may proceed to operation 1703, adding one to the partial count.

According to an embodiment, upon identifying that not only a portion of the fingerprint sensor has been touched (no in 1706), the electronic device may identify whether it duplicates existing recognition information in operation 1707. According to an embodiment, upon identifying that a whole touch, rather than a partial touch, is received, the electronic device may identify whether it duplicates the existing information. According to an embodiment, if including an area where the stored partial fingerprint information and the recognized partial fingerprint information are identical by a preset value or more, the electronic device may identify that they duplicate each other.

According to an embodiment, upon identifying that it duplicates the existing recognition information (yes in 1707), the electronic device may increase the duplicated count by 1 in operation 1708. According to an embodiment, the duplicated count may mean the number of pre-stored partial fingerprints duplicating the recognized partial fingerprint.

According to an embodiment, in operation 1709, the electronic device may identify whether the duplicated count is preset Y or more. According to an embodiment, if the duplicated count is preset Y or more (yes in 1709), the electronic device may increase the moving interval (offset) in operation 1710. According to an embodiment, the electronic device may increase the moving interval and then return to operation 1701.

According to an embodiment, if the duplicated count is less than preset Y (no in 1709), the electronic device may identify whether the guide frame is in the same position in operation 1711.

According to an embodiment, when the guide frame is in the same position, the electronic device may change the frame position in operation 1712. According to an embodiment, the electronic device may change the frame position and then return to operation 1701.

According to an embodiment, when the guide frame is not in the same position, the electronic device may return to operation 1701.

According to an embodiment, upon identifying that it does not duplicate the existing recognition information (no in 1707), the electronic device may identify whether fingerprint registration is complete in operation 1713. According to an embodiment, the electronic device may identify whether one fingerprint registration is complete based on a plurality of partial fingerprints recognized. According to an embodiment, the electronic device may obtain a plurality of partial fingerprints necessary for one fingerprint registration and, if one fingerprint is complete by combining the plurality of fingerprints, identify that fingerprint registration is complete.

According to an embodiment, if the fingerprint registration is complete (yes in 1713), the electronic device may terminate the fingerprint registration process.

According to an embodiment, if the fingerprint registration is not complete (no in 1713), the electronic device may define a number which is one larger than N as N in operation 1714 and return to operation 1701.

As such, it is possible to efficiently obtain partial fingerprints by adjusting the moving interval of the user interface based on the partial touch and duplicated touch during the process of recognizing partial fingerprints.

According to an embodiment, an electronic device (e.g., the electronic device 101 of FIG. 1) may comprise a display (e.g., the display module 160 of FIG. 1), a fingerprint sensor (e.g., the sensor module 176 of FIG. 1) disposed in a partial area of the display, and at least one processor (e.g., the processor 120 of FIG. 1).

According to an embodiment, the at least one processor may receive a user input for fingerprint registration.

According to an embodiment, the at least one processor may display a first user interface (e.g., the first user interface 310 of FIG. 3A, the first user interface 811 of FIG. 8A, the first user interface 1010 of FIG. 10A, the first user interface 1111 of FIG. 11, the first user interface 1211 of FIG. 12, or the first user interface 1311 of FIG. 13) for displaying information to lead to a position for a touch input based on a position of the fingerprint sensor in a first position of the display, in response to the user input.

According to an embodiment, the at least one processor may display, on the display, a second user interface (e.g., the second user interface 340 of FIG. 3B, the second user interface 410 of FIG. 4A, the second user interface 430 of FIG. 4A, the progress bar 431 of FIG. 4B, the user interface 720 of FIG. 7, the user interface 730 of FIG. 7, the second user interface 821 of FIG. 8A, the progress effect 822 of FIG. 8A, the second user interface 831 of FIG. 8A, the second user interface 840 of FIG. 8B, the second user interface 910 of FIG. 9A, the second user interface 1021 of FIG. 10B, the second user interface 1050 of FIG. 10C, the second user interface 1112 of FIG. 11, the second user interface 1212 of FIG. 12, the second user interface 1411 of FIG. 14, the second user interface 1431 of FIG. 14, the second user interface 1511 of FIG. 15, or the second user interface 1532 of FIG. 15) indicating a fingerprint recognition degree related to a first touch, based on reception of the first touch (e.g., the first touch 315 of FIG. 3B) on the first user interface.

According to an embodiment, the second user interface may be obtained by increasing a size of the first user interface, based on reception of the first touch.

According to an embodiment, the at least one processor may further display, on the display, a third user interface (e.g., the third user interface 330 of FIG. 3A, the third user interface 420 of FIG. 4A, the third user interface 421 of FIG. 4B, the third user interface 1060 of FIG. 10C, or the third user interface 1312 of FIG. 13) indicating a fingerprint registration progress based on a plurality of touches.

According to an embodiment, the at least one processor may change the third user interface to increase the fingerprint registration progress, based on completion of recognition of a fingerprint related to the first touch.

According to an embodiment, the at least one processor may display a message (e.g., the message 710 of FIG. 7, the guide message 920 for fingerprint registration of FIG. 9A, or the guide message 940 leading to maintain the touch of FIG. 9B) indicating a failure in recognition of the fingerprint, based on termination of the first touch before recognition of the fingerprint related to the first touch is complete.

According to an embodiment, the at least one processor may reposition the first user interface (e.g., the first user interface 310-1 of FIG. 3D) for displaying information to lead to a second touch input to a second position different from the first position, based on termination of the first touch after recognition of the fingerprint related to the first touch is complete.

According to an embodiment, the at least one processor may display the repositioned first user interface.

According to an embodiment, the at least one processor may reduce a repositioning interval of the first user interface, based on a fingerprint being recognized only through a partial area of the fingerprint sensor after the first user interface is repositioned.

According to an embodiment, the at least one processor may increase a repositioning interval of the first user interface, based on the same fingerprint being recognized a preset number of times or more after the first user interface is repositioned.

According to an embodiment, the at least one processor may resize the second user interface based on a size of an area of the first touch.

According to an embodiment, the at least one processor may reshape the first user interface based on a shape of an area of the first touch.

According to an embodiment, a method for controlling an electronic device (e.g., the electronic device 101 of FIG. 1) may comprise receiving a user input for fingerprint registration.

According to an embodiment, the method for controlling the electronic device may comprise displaying a first user interface (e.g., the first user interface 310 of FIG. 3A, the first user interface 811 of FIG. 8A, the first user interface 1010 of FIG. 10A, the first user interface 1111 of FIG. 11, the first user interface 1211 of FIG. 12, or the first user interface 1311 of FIG. 13) for displaying information to lead to a position for a touch input based on a position of a fingerprint sensor (e.g., the sensor module 176 of FIG. 1) in a first position of a display (e.g., the display module 160 of FIG. 1), in response to the user input.

According to an embodiment, the method for controlling the electronic device may comprise displaying, on the display, a second user interface (e.g., the second user interface 340 of FIG. 3B, the second user interface 410 of FIG. 4A, the second user interface 430 of FIG. 4A, the progress bar 431 of FIG. 4B, the user interface 720 of FIG. 7, the user interface 730 of FIG. 7, the second user interface 821 of FIG. 8A, the progress effect 822 of FIG. 8A, the second user interface 831 of FIG. 8A, the second user interface 840 of FIG. 8B, the second user interface 910 of FIG. 9A, the second user interface 1021 of FIG. 10B, the second user interface 1050 of FIG. 10C, the second user interface 1112 of FIG. 11, the second user interface 1212 of FIG. 12, the second user interface 1411 of FIG. 14, the second user interface 1431 of FIG. 14, the second user interface 1511 of FIG. 15, or the second user interface 1532 of FIG. 15) indicating a fingerprint recognition degree related to a first touch, based on reception of the first touch (e.g., the first touch 315 of FIG. 3B) on the first user interface.

According to an embodiment, the second user interface may be obtained by increasing a size of the first user interface, based on reception of the first touch.

According to an embodiment, the method for controlling the electronic device may further comprise displaying, on the display, a third user interface (e.g., the third user interface 330 of FIG. 3A, the third user interface 420 of FIG. 4A, the third user interface 421 of FIG. 4B, the third user interface 1060 of FIG. 10C, or the third user interface 1312 of FIG. 13) indicating a fingerprint registration progress based on a plurality of touches.

According to an embodiment, the method for controlling the electronic device may further comprise changing the third user interface to increase the fingerprint registration progress, based on completion of recognition of a fingerprint related to the first touch.

According to an embodiment, the method for controlling the electronic device may further comprise displaying a message (e.g., the message 710 of FIG. 7, the guide message 920 for fingerprint registration of FIG. 9A, or the guide message 940 leading to maintain the touch of FIG. 9B) indicating a failure in recognition of the fingerprint, based on termination of the first touch before recognition of the fingerprint related to the first touch is complete.

According to an embodiment, the method for controlling the electronic device may further comprise repositioning the first user interface for displaying information to lead to a second touch input to a second position different from the first position, based on termination of the first touch after recognition of the fingerprint related to the first touch is complete.

According to an embodiment, the method for controlling the electronic device may further comprise displaying the repositioned first user interface (e.g., the first user interface 310-1 of FIG. 3D).

According to an embodiment, the method for controlling the electronic device may further comprise reducing a repositioning interval of the first user interface, based on a fingerprint being recognized only through a partial area of the fingerprint sensor after the first user interface is repositioned.

According to an embodiment, the method for controlling the electronic device may further comprise increasing a repositioning interval of the first user interface, based on the same fingerprint being recognized a preset number of times or more after the first user interface is repositioned.

According to an embodiment, the method for controlling the electronic device may further comprise resizing the second user interface based on a size of an area of the first touch.

According to an embodiment, the method for controlling the electronic device may further comprise reshaping the first user interface based on a shape of an area of the first touch.

According to an embodiment, in a non-transitory computer-readable recording medium storing one or more programs, the one or more programs may enable an electronic device to receive a user input for fingerprint registration.

According to an embodiment, the electronic device may display a first user interface (e.g., the first user interface 310 of FIG. 3A, the first user interface 811 of FIG. 8A, the first user interface 1010 of FIG. 10A, the first user interface 1111 of FIG. 11, the first user interface 1211 of FIG. 12, or the first user interface 1311 of FIG. 13) for displaying information to lead to a position for a touch input based on a position of the fingerprint sensor in a first position of the display, in response to the user input.

According to an embodiment, the electronic device may display, on the display, a second user interface (e.g., the second user interface 340 of FIG. 3B, the second user interface 410 of FIG. 4A, the second user interface 430 of FIG. 4A, the progress bar 431 of FIG. 4B, the user interface 720 of FIG. 7, the user interface 730 of FIG. 7, the second user interface 821 of FIG. 8A, the progress effect 822 of FIG. 8A, the second user interface 831 of FIG. 8A, the second user interface 840 of FIG. 8B, the second user interface 910 of FIG. 9A, the second user interface 1021 of FIG. 10B, the second user interface 1050 of FIG. 10C, the second user interface 1112 of FIG. 11, the second user interface 1212 of FIG. 12, the second user interface 1411 of FIG. 14, the second user interface 1431 of FIG. 14, the second user interface 1511 of FIG. 15, or the second user interface 1532 of FIG. 15) indicating a fingerprint recognition degree related to the first touch, based on reception of the first touch (e.g., the first touch 315 of FIG. 3B) on the first user interface.

According to an embodiment, the second user interface may be obtained by increasing a size of the first user interface, based on reception of the first touch.

According to an embodiment, the electronic device may further display, on the display, a third user interface (e.g., the third user interface 330 of FIG. 3A, the third user interface 420 of FIG. 4A, the third user interface 421 of FIG. 4B, the third user interface 1060 of FIG. 10C, or the third user interface 1312 of FIG. 13) indicating a fingerprint registration progress based on a plurality of touches.

According to an embodiment, the electronic device may change the third user interface to increase the fingerprint registration progress, based on completion of recognition of a fingerprint related to the first touch.

According to an embodiment, the electronic device may display a message (e.g., the message 710 of FIG. 7, the guide message 920 for fingerprint registration of FIG. 9A, or the guide message 940 leading to maintain the touch of FIG. 9B) indicating a failure in recognition of the fingerprint, based on termination of the first touch before recognition of the fingerprint related to the first touch is complete.

According to an embodiment, the electronic device may reposition the first user interface for displaying information to lead to a second touch input to a second position different from the first position, based on termination of the first touch after recognition of the fingerprint related to the first touch is complete.

According to an embodiment, the electronic device may display the repositioned first user interface (e.g., the first user interface 310-1 of FIG. 3D).

According to an embodiment, the electronic device may reduce a repositioning interval of the first user interface, based on a fingerprint being recognized only through a partial area of the fingerprint sensor after the first user interface is repositioned.

According to an embodiment, the electronic device may increase a repositioning interval of the first user interface, based on the same fingerprint being recognized a preset number of times or more after the first user interface is repositioned.

According to an embodiment, the electronic device may resize the second user interface based on a size of an area of the first touch.

According to an embodiment, the electronic device may reshape the first user interface based on a shape of an area of the first touch.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to,— connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic, — logic block, — part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a display;
a fingerprint sensor provided in an area of the display;
a processor; and
memory storing instructions that, when executed by the processor, cause the electronic device to:
receive a user input for a registration of a fingerprint, wherein the registration of the fingerprint is performed based on a plurality of recognitions, of the fingerprint, corresponding to a plurality of touches, respectively, based on the user input, control the display to display a first user interface displaying information to guide a position for a first touch among the plurality of touches based on a position of the fingerprint sensor, at a first position on the display, based on receiving the first touch among the plurality of touches on the first user interface, control the display to display a second user interface indicating a degree of a fingerprint recognition of the first touch, and based on receiving a second touch among the plurality of touches on the first user interface after the first touch is released, control the display to display a third user interface indicating a degree of a fingerprint recognition of the second touch, wherein the second user interface is larger than the first user interface, and the third user interface is larger than the second user interface.

2. The electronic device of claim 1, wherein the instructions, when executed by the processor, cause the electronic device to display, on the display, a fourth user interface indicating a progress amount of the registration of the fingerprint based on the plurality of touches.

3. The electronic device of claim 2, wherein the instructions, when executed by the processor, cause the electronic device to, based on completion of the fingerprint recognition related to the first touch, control the display to change the fourth user interface to increase the progress amount of the registration of the fingerprint.

4. The electronic device of claim 1, wherein the instructions, when executed by the processor, cause the electronic device to display, on the display, a message indicating a failure of the fingerprint recognition, based on termination of the first touch before the fingerprint recognition related to the first touch is complete.

5. The electronic device of claim 1, wherein the instructions, when executed by the processor, cause the electronic device to control the display to reposition the first user interface displaying information to guide a third touch to a second position on the display that is different from the first position, based on termination of the second touch after the fingerprint recognition related to the second touch is complete.

6. The electronic device of claim 5, wherein the instructions, when executed by the processor, cause the electronic device to, based on the fingerprint being recognized only through a partial area of the fingerprint sensor after the first user interface is repositioned, reduce a repositioning interval of the first user interface.

7. The electronic device of claim 5, wherein the instructions, when executed by the processor, cause the electronic device to, based on a same fingerprint being recognized at least a preset number of times after the first user interface is repositioned increase a repositioning interval of the first user interface.

8. The electronic device of claim 1, wherein the instructions, when executed by the processor, cause the electronic device to display the second user interface with a tilt based on the area of the first touch being tilted to a side.

9. The electronic device of claim 1, wherein the instructions, when executed by the processor, cause the electronic device to obtain the third user interface by enlarging the second user interface.

10. The electronic device of claim 1, wherein a shape of the first user interface is same as a shape of the second user interface, and a shape of the third user interface is same as the shape of the second user interface.

11. The electronic device of claim 1, wherein the second user interface includes a first progress bar indicating the degree of the fingerprint recognition of the first touch, and
wherein the third user interface includes a second progress bar indicating the degree of the fingerprint recognition of the second touch.

12. A method for controlling an electronic device comprises:
receiving a user input for a registration of a fingerprint, wherein the registration of the fingerprint is performed based on a plurality of recognitions, of the fingerprint, corresponding to a plurality of touches, respectively;
based on the user input, displaying, at a first position on a display of the electronic device, a first user interface displaying information to guide a position for a first touch among the plurality of touches based on a position of a fingerprint sensor;
based on receiving the first touch among the plurality of touches on the first user interface, displaying, on the display, a second user interface indicating a degree of a fingerprint recognition of the first touch, wherein the second user interface is larger than the first user interface; and
based on receiving a second touch among the plurality of touches on the first user interface after the first touch is released, displaying, on the display, a third user interface indicating a degree of a fingerprint recognition of the second touch, wherein the third user interface is larger than the second user interface.

13. The method of claim 12, further comprising displaying, on the display, a fourth user interface indicating a progress amount of the registration of the fingerprint based on the plurality of touches.

14. The method of claim 13, further comprising, based on completion of the fingerprint recognition related to the first touch, changing the fourth user interface to increase the progress amount of the registration of the fingerprint.

15. The method of claim 12, further comprising, based on termination of the first touch before the fingerprint recognition related to the first touch is complete, displaying, on the display, a message indicating a failure in the fingerprint recognition.

16. The method of claim 12, further comprising displaying the second user interface with a tilt based on an area of the first touch being tilted to a side.

* * * * *